(12) United States Patent
Suzuki et al.

(10) Patent No.: US 11,380,927 B2
(45) Date of Patent: Jul. 5, 2022

(54) HIGHLY REINFORCED IONOMER MEMBRANES FOR HIGH SELECTIVITY AND HIGH STRENGTH

(71) Applicants: W. L. Gore & Associates, Inc., Newark, DE (US); W. L. Gore & Associates G.K., Tokyo (JP)

(72) Inventors: Takeyuki Suzuki, Tokyo (JP); Alexander Agapov, Newark, DE (US); Mark Edmundson, Newark, DE (US)

(73) Assignees: W. L. Gore & Associates, Inc., Newark, DE (US); W. L. Gore & Associates G.K., Tokyo (JP)

( * ) Notice: Subject to any disclaimer, the term of this patent is extended or adjusted under 35 U.S.C. 154(b) by 19 days.

(21) Appl. No.: 16/621,193

(22) PCT Filed: Jun. 15, 2018

(86) PCT No.: PCT/US2018/037777
§ 371 (c)(1),
(2) Date: Dec. 10, 2019

(87) PCT Pub. No.: WO2018/232254
PCT Pub. Date: Dec. 20, 2018

(65) Prior Publication Data
US 2020/0243887 A1    Jul. 30, 2020

Related U.S. Application Data

(63) Continuation of application No. PCT/US2017/037595, filed on Jun. 15, 2017.

(51) Int. Cl.
*H01M 8/1039* (2016.01)
*H01M 8/1004* (2016.01)
(Continued)

(52) U.S. Cl.
CPC ....... *H01M 8/1039* (2013.01); *H01M 8/1004* (2013.01); *H01M 8/1023* (2013.01);
(Continued)

(58) Field of Classification Search
None
See application file for complete search history.

(56) References Cited

U.S. PATENT DOCUMENTS

| | | | | |
|---|---|---|---|---|
| 6,130,175 A | * | 10/2000 | Rusch | B01D 69/10 442/77 |
| 2011/0318669 A1 | * | 12/2011 | Miyake | H01M 8/1081 429/482 |
| 2014/0370404 A1 | * | 12/2014 | Kato | H01M 8/0241 429/418 |

OTHER PUBLICATIONS

International Search Report and Written Opinion for International Application No. PCT/US2018/037777 dated Aug. 8, 2018.
(Continued)

*Primary Examiner* — Daniel S Gatewood

(57) ABSTRACT

Embodiments are directed to composite membranes having: increased volume of the microporous polymer structure relative to the total volume of the PEM; decreased permeance and thus increased selectivity; and lower ionomer content. An increased amount of polymers of the microporous polymer structure is mixed with a low equivalent weight ionomer (e.g., <460 cc/mole eq) to obtain a composite material having at least two distinct materials. Various embodiments provide a composite membrane comprising a microporous polymer structure that occupies from 13 vol % to 65 vol % of a total volume of the composite membrane, and an ionomer impregnated in the microporous polymer structure. The acid content of the composite membrane is 1.2 meq/cc to 3.5 meq/cc, and/or the thickness of the composite membrane is less than 17 microns. The selectivity of the
(Continued)

composite membrane is greater than 0.05 MPa/mV, based on proton conductance and hydrogen permeance.

35 Claims, 11 Drawing Sheets

(51) Int. Cl.
    *H01M 8/1023*     (2016.01)
    *H01M 8/1053*     (2016.01)
    *H01M 8/1062*     (2016.01)
    *H01M 8/1067*     (2016.01)
    *H01M 8/10*     (2016.01)

(52) U.S. Cl.
    CPC ....... *H01M 8/1053* (2013.01); *H01M 8/1062* (2013.01); *H01M 8/1067* (2013.01); *H01M 2008/1095* (2013.01)

(56) References Cited

OTHER PUBLICATIONS

Kim et al., "Moving Beyond Mass-Based Parameters for Conductivity Analysis of Sulfonated Polymers", Annu. Rev. Chem. Biomol. Eng., vol. 1, 2010, pp. 123-148.
Kusoglu et al., "New Insights into Perfluorinated Sulfonic-Acid Ionomers", Chem. Rev., 2017, 117, 987-1104.

* cited by examiner

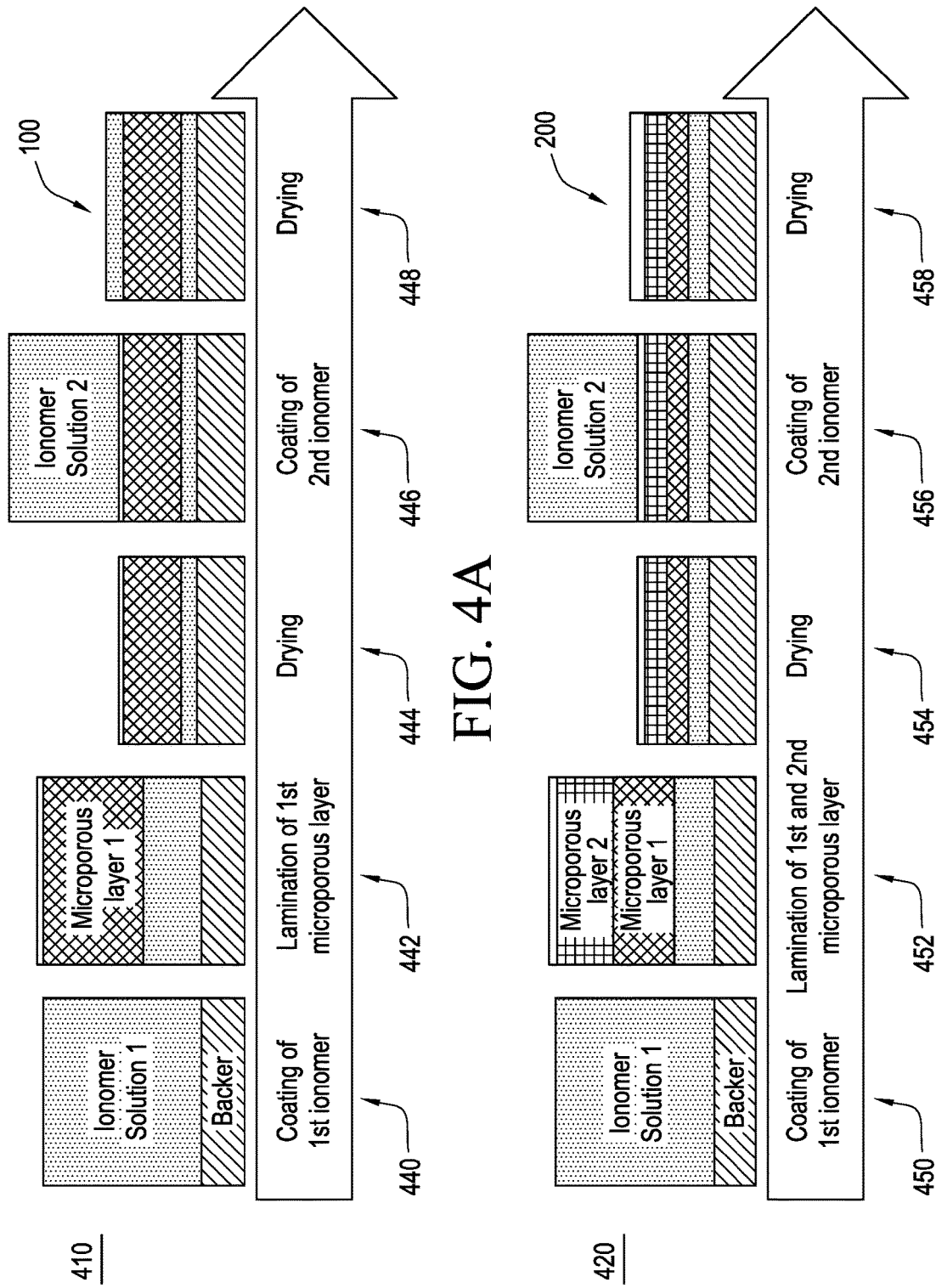

FIG. 6

| Example | | Microporous polymer structure | | | | | | | | # of microporous layers | Are microporous layers touching |
|---|---|---|---|---|---|---|---|---|---|---|---|
| | | | Material | Mass per area (g/m²) | Thickness (μm) | Density (g/w) | ATEQ (L/hr@12mbar) | Gurley (sec) | Bubble point (psi) | | |
| 1 | 1.1 comparitive | Membrane 1 | ePTFE | 0.6 | 3.6 | 0.17 | 89.6 | N/A | 75.0 | 1 | - |
| | 1.2 inventive | Membrane 2 | ePTFE | 3.1 | 9.4 | 0.33 | 36.9 | 6.0 | 56.8 | 1 | - |
| 2 | 2.1 comparitive | Membrane 3 | ePTFE | 1.2 | 5.4 | 0.23 | 95.3 | N/A | 38.0 | 1 | - |
| | 2.2 inventive | Membrane 4 | ePTFE | 2.8 | 9.6 | 0.29 | 65.2 | 3.3 | 34.4 | 1 | - |
| 3 | 3.1 comparitive | Membrane 1 | ePTFE | 0.6 | 3.6 | 0.17 | 89.6 | N/A | 75.0 | 1 | - |
| | 3.2 inventive | Membrane 5 | ePTFE | 8.9 | 25.1 | 0.36 | 23.2 | 9.1 | 42.7 | 1 | - |
| 4 | 4.1 comparitive | Membrane 1 | ePTFE | 0.6 | 3.6 | 0.17 | 89.6 | N/A | 75.0 | 1 | - |
| | 4.2 inventive | Membrane 6 | ePTFE | 1.9 | 7.2 | 0.27 | 26.5 | 7.8 | 137.6 | 1 | - |
| | 4.3 inventive | Membrane 7 | ePTFE | 4.8 | 14.8 | 0.33 | 21.5 | 9.8 | 68.4 | 1 | - |
| 5 | 5.1 comparitive | Membrane 1 | ePTFE | 0.6 | 3.6 | 0.17 | 89.6 | N/A | 75.0 | 1 | - |
| | 5.2 inventive | Membrane 8 | ePTFE | 2.2 | N/A | N/A | N/A | N/A | N/A | 1 | - |
| 6 | 6.1 comparitive | Membrane 6 | ePTFE | 1.9 | 7.2 | 0.27 | 26.5 | 7.8 | 137.6 | 1 | - |
| | 6.2 inventive | Membrane 9 | ePTFE | 5.8 | 12.5 | 0.46 | 34.1 | 6.6 | 32.2 | 1 | - |
| 7 | 7.1 comparitive | Membrane 10 | ePTFE | 3.0 | 15.2 | 0.20 | 52.0 | 4.1 | 36.6 | 1 | - |
| | 7.2 inventive | Membrane 9 | ePTFE | 5.8 | 12.5 | 0.46 | 34.1 | 6.6 | 32.2 | 1 | - |
| | 7.3 inventive | Membrane 2 and membrane 10; data for combined layers of 2 and 10 | ePTFE | 6.1 | 24.6 | 0.25 | N/A- | N/A | N/A | 2 | Yes |
| 8 | 8.1 comparitive | Membrane 10 | ePTFE | 3.0 | 15.2 | 0.20 | 52.0 | 4.1 | 36.6 | 1 | - |
| | 8.2 inventive | Membrane 7 | ePTFE | 4.7 | 14.0 | 0.34 | 32.1 | 6.8 | 47.1 | 1 | - |
| 9 | 9.1 comparitive | Membrane 1 | ePTFE | 0.6 | 3.6 | 0.17 | 89.6 | N/A | 75.0 | 1 | - |
| | 9.2 inventive | Membrane 10 | ePTFE | 3.0 | 15.2 | 0.20 | 52.0 | 4.1 | 36.6 | 1 | - |
| 10 | 10.1 comparitive | Membrane 1 | ePTFE | 0.6 | 3.6 | 0.17 | 89.6 | N/A | 75.0 | 1 | - |
| | 10.2 inventive | Membrane 11 | ePTFE | 4.8 | 14.8 | 0.33 | 21.5 | 9.8 | 68.4 | 1 | - |
| 11 | 11.1 comparitive | 2 layers of membrane 1; data for single layer of membrane 1 | ePTFE | 0.6 | 3.6 | 0.17 | 89.6 | N/A | 75.0 | 2 | No |
| | 11.2 inventive | 2 layers of Membrane 4; data for single layer of membrane 4 | ePTFE | 2.8 | 9.6 | 0.29 | 65.2 | 3.2 | 34.4 | 2 | No |
| 12 | 12.1 comparitive | Membrane 1 | ePTFE | 0.6 | 3.6 | 0.17 | 89.6 | N/A | 75.0 | 1 | - |
| | 12.2 inventive | Membrane 3 | ePTFE | 1.2 | 5.4 | 0.23 | 95.3 | N/A | 38.0 | 1 | - |
| 14 | 14.1 comparitive | Membrane 12 | PCTE | 7.9 | 9.3 | 0.85 | 1281.8 | N/A | 0.9 | 1 | - |
| | 14.2 inventive | Membrane 13 | PCTE | 10.4 | 12.3 | 0.85 | 2605.5 | N/A | 1.1 | 1 | - | ns
HIGHLY REINFORCED IONOMER MEMBRANES FOR HIGH SELECTIVITY AND HIGH STRENGTH

RELATED APPLICATIONS

The present application is a national phase filing under 35 USC 371 of International Application No. PCT/US2018/037777, filed on Jun. 15, 2018, which is a continuation of International Application No. PCT/US2017/037595, filed on Jun. 15, 2017, the entire contents and disclosures of which are hereby incorporated by reference.

FIELD OF THE INVENTION

This disclosure relates to polymer electrolyte membranes, and in particular, to a composite membrane having a high volume percent of a microporous polymer structure and surprisingly high selectivity for proton transport compared to hydrogen transport.

BACKGROUND OF THE INVENTION

Polymer Electrolyte Membranes (PEMs) are critical components in many applications, such as fuel cells, electrolyzers, flow batteries, and humidifiers. Among these, Polymer Electrolyte Membrane Fuel Cells (PEMFCs) are of particular interest. In a PEMFC, the PEM is part of a Membrane Electrode Assembly (MEA). The MEA is the core component of the fuel cell where the electrochemical reactions take place that generate power. A typical MEA comprises a PEM, two catalyst layers (i.e., the anode and the cathode, which are attached to opposite sides of the PEM), and two gas diffusion layers (GDLs, which are attached to the two outer surfaces of the catalyst layers). The PEM separates two reactant gas streams. On the anode side of the MEA, a fuel, e.g., hydrogen gas, is oxidized to separate the electrons and protons. The cell is designed so that the electrons travel through an external circuit while the protons migrate through the PEM. On the cathode side the electrons and protons react with an oxidizing agent (i.e., oxygen or air) to produce water and heat. In this manner, an electrochemical potential is maintained and current can be drawn from the fuel cell to perform useful work.

There are several key properties that are desired in a PEM for fuel cell applications. As described above, the primary functions of the PEM in a PEMFC are to transport protons with minimal resistance while keeping the reactant gases separate. Therefore, conductance and permeance are key properties of a PEM. Herein, conductance will refer to the transport of protons from the anode side of the MEA to the cathode side. Conductance affects the performance and power density of the fuel cell. Similarly, permeance will refer to the transport of hydrogen from the anode side of the MEA to the cathode side. Permeance affects the fuel efficiency of the fuel cell. The ratio of these two properties (i.e., proton conductance divided by hydrogen permeance) will be referred to as selectivity. Another critical property of PEMs is strength, which affects the useful lifetime of the PEM in the application. The cost of the PEM is also an important consideration, especially in the automotive market, which is a key economic driver for PEMFC technology.

High selectivity (via high conductance and/or low permeance), high durability, and low cost, are all desirable qualities in a PEM. However, as a matter of practical engineering, conflicts often arise in the optimization of these properties, requiring tradeoffs to be accepted. One can attempt to improve selectivity by increasing conductance via reduction in membrane thickness. Making a PEM thinner also lowers its cost because ionomer is expensive and less of it is used. However, thinner membranes have increased hydrogen permeation, which erodes any selectivity gains from increased proton conduction, and results in thinner membranes having similar or worse selectivity than thicker ones. In addition, thinner membranes also are weaker, frequently lacking sufficient mechanical durability for aggressive automotive conditions. Reducing the membranes physical thickness can also increase the susceptibility to damage or puncture from other fuel cell components leading to shorter cell lifetimes. Another way to improve selectivity is by increasing the acid concentration of the PEM. Typically, increasing acid concentration improves selectivity by increasing proton conduction without a need to decrease thickness and without significant adverse effects to hydrogen permeation. However, an increase in overall acid content reduces the PEM durability in aggressive automotive conditions due to excessive hydration. Increasing the overall acid content of the PEM also increases its cost as ionomers with low equivalent weight are typically much more expensive. As shown in these examples, managing these PEM design trade-offs is challenging, particularly when optimizing selectivity, durability, and cost.

U.S. Pat. No. 5,599,614 to Bahar et al. describes an integral composite membrane comprising a base material and an ion exchange material. The base material is a microporous membrane which is defined by a thickness of less than 1 mil (e.g. 0.8 mils) and a microstructure characterized by nodes interconnected by fibrils, or a microstructure characterized by fibrils with no nodes present. The ion exchange resin substantially impregnates the membrane such that the membrane is essentially air impermeable. The resulting composite membrane is characterized by enhanced strength by the microporous membrane allowing for reduction in thickness of the impregnated layer, and thereby lowering the resistance to proton conduction. These thin integral composite membranes thus are able to provide lower resistance, while maintaining high strength.

U.S. Pat. No. 6,613,203 to Hobson, et al. describes a composite membrane comprising an expanded polytetrafluoroethylene (ePTFE) membrane impregnated with an ion exchange material. The ePTFE has a morphological structure of highly elongated nodes interconnected by fibrils. This composite membrane showed increased hardness and durability of the composite membrane, enabling reduction of the composite membrane thickness and improved proton conduction of the fuel cell.

There have been efforts to produce ion exchange resins with higher acid content to improve fuel cell performance through increase of proton conductance. U.S. Pat. No. 8,071,702 to Wu, et al. demonstrates that a low equivalent weight (high acid content) ionomer that has low hydration (i.e., water uptake) can be produced which is beneficial for increase of proton conduction.

However, there are still shortcomings with the aforementioned art. In particular, teachings of Bahar et al and Hobson et al are directing to make composite membranes thinner so that a fuel cell could benefit from increased proton conductance. However, Bahar et al and Hobson et al are not teaching how to improve or keep constant selectivity of a composite membrane. An issue of decreased selectivity due to increased hydrogen permeance of thinner membranes is not addressed in those inventions. Also, the issue of higher cost for low equivalent weight ionomers was not addressed. This approach to composite PEM design results in a reasonable trade-off of selectivity, durability, and cost, and has dominated the automotive PEMFC market for approximately 20 years. Recently, however, the relatively low selectivity of existing composite PEMs has begun to limit further improvements. Accordingly, the need exists for a thin composite membranes that combines high selectivity with high durability and low cost.

SUMMARY OF THE INVENTION

The inventors of the present invention have endeavored to solve the problems mentioned above. As a consequence, they found that the selectivity is improved because the crystallinity of the composite PEM is increased, which acts as a barrier to reduce permeance, while the acid content remains high, thereby maintaining the desired proton conductance. Additionally, composite membranes developed in accordance with the present disclosure advantageously have: (i) increased volume of the microporous polymer structure relative to the total volume of the PEM and thus improved durability; and (ii) lower ionomer content and thus lower materials cost.

According to an aspect of the present invention, there is provided a composite membrane comprising (1) a microporous polymer structure present in an amount from 13 vol % to 65 vol % based on the total volume of the composite membrane; and (2) an ion exchange material at least partially embedded within the microporous polymer structure and rendering the microporous polymer structure occlusive, the ion exchange material having an equivalent volume equal to or less than 460 cc/mole eq. The composite membrane has an acid content of 1.2 meq/cc to 3.5 meq/cc. The composite membrane has a thickness of less than 17 microns. The composite membrane may have a selectivity of greater than 0.05 MPa/mV. In some embodiments, the composite membrane may have a selectivity of greater than 0.35 MPa/mV. In some embodiments, the composite membrane may have a selectivity of greater than 0.50 MPa/mV. In other embodiments, composite membrane may have a selectivity of greater than 0.80 MPa/mV. The composite membrane may include at least one support layer attached to one or more external surfaces of the microporous polymer structure.

In some embodiments, the ion exchange material may be fully embedded within the microporous polymer structure. The ion exchange material may include more than one ion exchange material in the form of a mixture of ion exchange materials. The mixture of ion exchange materials has an equivalent volume equal to or less than 460 cc/mole eq. In other embodiments, the ion exchange material may include more than one layer of ion exchange material. The layers of ion exchange material may be formed of the same ion exchange material. Alternatively, the layers of ion exchange material may be formed of different ion exchange materials. The average equivalent volume of all the layers of ion exchange material is equal to or less than 460 cc/mole eq. At least one of the layers of ion exchange material comprises a mixture of ion exchange materials. The ion exchange material may include an ionomer. The at least one ionomer may include a proton conducting polymer. The proton conducting polymer may include perfluorosulfonic acid. In one embodiment at least one ionomer may have a density not lower than 1.96 g/cc at 0% relative humidity. In another embodiment at least one ionomer may have a density not lower than 1.8 g/cc at 0% relative humidity. In yet another embodiment at least one ionomer may have a density not lower than 1.0 g/cc at 0% relative humidity.

In some embodiments, the microporous polymer structure has a first surface and a second surface. The ion exchange material may form a layer on the first surface, on the second surface, or both on the first surface and the second surface. According to various embodiments, the ion exchange material may be partially embedded within the microporous polymer structure leaving a non-occlusive portion of the microporous polymer structure closest to the first surface, second surface or both. The non-occlusive portion may be free of any of the ion exchange material. The non-occlusive portion may include a coating of ion exchange material to an internal surface of the microporous polymer structure.

According to various embodiments, the microporous polymer structure comprises at least two microporous polymer layers. The microporous polymer layers may be the same or the microporous polymer layers may be different. At least two of the microporous polymer layers may be in direct contact. In some embodiments, at least two of the microporous polymer layers may not be in direct contact.

In some embodiments, the microporous polymer structure may include a fluorinated polymer. In some embodiments, the microporous polymer structure includes a perfluorinated porous polymeric material. The fluorinated porous polymeric material may include polytetrafluoroethylene (PTFE), expanded polytetrafluoroethylene (ePTFE), polyvinylidene fluoride (PVDF), expanded polyvinylidene fluoride (ePVDF), expanded poly(ethylene-co-tetrafluoroethylene) (eEPTFE) or mixtures thereof. In other embodiments. In other embodiments, the microporous polymer structure may include a hydrocarbon polymer. The hydrocarbon material may include polyethylene, polypropylene, polycarbonate, or polystyrene.

A membrane electrode assembly, a fell cell and a redox flow battery provided with the above-mentioned composite membrane are also included in the present invention.

According to the present invention, the volume of the microporous polymer structure is increased relative to the total volume of the composite membrane. This results in improved durability of the composite membrane. Moreover, the ion exchange material maintains its low equivalent weight, which compensates for dilution of the ionomer caused by the increase in volume of the microporous polymer structure. Accordingly, the overall acid content and overall thickness of the composite membrane remains substantially the same. Increasing the volume of the microporous polymer structure while conserving the acid content and overall thickness of the composite membrane allows for embodiments of the present disclosure to maintain the present (or improved) levels of conductance while maintaining an ultra-thin profile, and improved durability and permeance characteristics.

It has surprisingly been found that the selectivity of the composite membrane can be improved by maximizing the volume percent of the microporous polymer structure if the total acid concentration of the composite membrane is also maintained at a high level.

Other aspects and variants of the invention will become evident in the ensuing discussion.

BRIEF DESCRIPTION OF THE DRAWINGS

The present disclosure will be better understood in view of the following non-limiting figures, in which:

FIGS. 4A-4C shows exemplary flow diagrams of processes for constructing exemplary composite membranes in accordance with some aspects of the invention;

FIG. 6 shows a table illustrating properties of the microporous polymer structure used in various test procedures in series of examples in accordance with some aspects of the invention.

DETAILED DESCRIPTION OF THE INVENTION

Figure 1A:
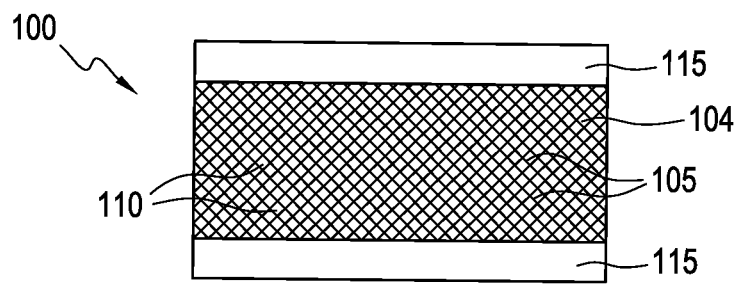
FIGS. 1A-1G show a cross sectional side view of a composite membrane in accordance with some aspects of the invention.

It has been discovered that selectivity of a composite membrane can be surprisingly improved by maximizing the volume percent of the microporous polymer structure if the total acid concentration of the composite membrane is also maintained at a high level while keeping a thickness of the composite membrane below a threshold (e.g. less than 17 microns).

The improvement is surprising for several reasons. First, it was expected that an ideal impregnation of the microporous polymer structure would have a negligible effect on selectivity, as the microporous polymer structure is a very effective barrier to the transport of both protons and hydrogen, and would therefore not affect their ratio. Second, increasing the volume percent of the microporous polymer structure makes it more difficult to achieve full occlusion. Residual porosity would be expected to provide leak paths that would increase hydrogen permeance and therefore reduce selectivity. Finally, lack of full occlusion and the resulting poor selectivity would also be expected because of the difficulty in imbibing the lower equivalent weight ionomers required to maintain high acid concentration in the composite PEM. This difficulty in imbibing is a direct result of the stronger polyelectrolyte effect inherent in solutions of lower equivalent weight ionomers, which results in increased viscosity that impedes imbibing into the small pores of the microporous polymer structure.

Nevertheless, it has now been shown that selectivity can be improved by making PEMs with a high volume percent of microporous polymer structure. Without limiting the scope of the claims, the selectivity is improved because the microporous polymer structures act as a barrier to gas permeance and the volume fraction of the microporous polymer structures in the composite PEM is increased while the acid content remains high, thereby maintaining the desired proton conductance without increasing the thickness of the overall composite membrane.

Previous efforts for developing composite membranes with high acid content resulted in a decrease of reinforcement volume fraction of the composite membrane. This, in return, results in increased production costs as more of expensive ionomer is used. As a result, a thicker membrane was needed to prevent failure of such fuel cell. Inventors were able to develop a composite membrane with high acid content (e.g. acid content of 1.2 meq/cc to 3.5 meq/cc) while keeping the thickness of the composite membrane below a threshold (e.g. less than 17 microns). This was achieved by increasing the volume of the microporous polymer structure in the composite membrane while conserving the acid content and overall thickness of the composite membrane. Surprisingly, inventors found that incorporation of larger volume fraction of microporous polymer structure while conserving the acid content leads to the improvement of selectivity because the crystallinity of the composite PEM is increased, which acts as a barrier to reduce permeance, while the acid content remains high, thereby maintaining the desired proton conductance.

Additionally, composite membranes developed in accordance with the present disclosure advantageously have: (i) increased volume of the microporous polymer structure relative to the total volume of the PEM and thus improved durability; and (ii) lower ionomer content and thus lower materials cost. According to various embodiments, the composite membrane with equivalent proton conductance, but lower permeance when using an ionomer with a higher acid concentration may be achieved by increased volume of the microporous polymer structure. That is, the acid concentration of the ionomer and volume percent of microporous polymer structure used in a composite membrane of the present disclosure is higher than the acid concentration of the ionomer and volume percent of microporous polymer structure used in a conventional composite membrane having substantially the same thickness as the composite membrane of the present disclosure. In some embodiments this will result in a composite membrane having increased selectivity at increased volume of the microporous polymer structure relative to the total volume of the PEM.

This points to a fundamentally different design strategy for a new generation of composite membranes, namely thin membranes that are very highly reinforced, resulting in high selectivity. Thus, aspects of the present disclosure are directed to increasing the volume of the microporous polymer structure relative to the total volume of the PEM while surprisingly and unexpectedly maintaining or increasing PEM selectivity without increasing the thickness of the composite membrane above a predetermined threshold.

In one embodiment, the disclosure is directed to a composite membrane comprising a microporous polymer structure that occupies from 13 vol % to 65 vol % of a total volume of the composite membrane, and an ion exchange material (e.g. an ionomer) embedded at least partially within the microporous polymer structure. The acid content of the composite membrane is 1.2 meq/cc to 3.5 meq/cc while the thickness of the composite membrane is kept at less than 17 microns. The selectivity of the composite membrane is optionally greater than 0.05 MPa/mV, based on proton conductance and hydrogen permeance. Advantageously, by utilizing two distinct materials (i.e., the microporous polymer structure and the ion exchange material), the volume of the microporous polymer structure is able to be increased relative to the total volume of the composite membrane resulting in improved durability. Moreover, the ion exchange material is able to maintain its low equivalent weight, which compensates for dilution of the ionomer caused by the increase in volume of the microporous polymer structure, thereby conserving acid content and overall thickness of the composite membrane. Increasing the volume of the microporous polymer structure while conserving the acid content and overall thickness of the composite membrane allows for embodiments of the present disclosure to maintain the present (or improved) levels of conductance while maintaining an ultra-thin profile, and improved durability and permeance characteristics.

Embodiments have been described using volume-based values instead of weight-based values in order to provide a way for meaningful comparison between composite membranes comprising ionomers and microporous polymer structures of different densities. Volume-based normalization was pointed out in scientific literature as more appropriate for description of transport phenomena like proton conduction for PEM used in fuel cells (e.g. Kim, Y. S.; Pivovar, B. S. Annu. Rev. Chem. Biomol. Eng. 2010, 1, 123-148). More specifically, weight-based measurements may be used to make comparisons between polymer electrolytes, but they have significant limitations when correlated to proton conductivity. These limitations arise in part because different polymers can have significantly different densities and because conduction occurs over length scales more appropriately represented by volume-based measurements rather than weight-based measurements.

Various definitions used in the present disclosure are provided below.

As used herein, the term "selectivity" refers to a ratio of the proton conductance of a composite membrane divided by the hydrogen permeance of that composite membrane. Composite membranes with high selectivity (via high conductance and/or low permeance) are preferred in fuel cell applications. The proton conductance of the composite membrane is measurable as ion conductivity per unit thickness. The permeance of the composite membrane is measurable as permeability (e.g. hydrogen permeance) per unit thickness.

As used herein, the term "permeance" refers to the ability of a composite membrane to transport hydrogen gas, with lower permeance values generally being preferred for a desired fuel efficiency. The term "conductance" refers to the ability of a composite membrane to transport protons, with greater conductance values generally being preferred for a desired power density.

As used herein, the terms "ionomer" and "ion exchange material" refer to a cation exchange material, an anion exchange material, or an ion exchange material containing both cation and anion exchange capabilities. Mixtures of ion exchange materials may also be employed. Ion exchange material may be perfluorinated or hydrocarbon-based. Suitable ion exchange materials include, for example, perfluorosulfonic acid polymers, perfluorocarboxylic acid polymers, perfluorophosphonic acid polymers, styrenic ion exchange polymers, fluorostyrenic ion exchange polymers, polyarylether ketone ion exchange polymers, polysulfone ion exchange polymers, bis(fluoroalkylsulfonyl)imides, (fluoroalkylsulfonyl)(fluorosulfonyl)imides, polyvinyl alcohol, polyethylene oxides, divinyl benzene, metal salts with or without a polymer, and mixtures thereof. In exemplary embodiments, the ion exchange material comprises perfluorosulfonic acid (PFSA) polymers made by copolymerization of tetrafluoroethylene and perfluorosulfonyl vinyl ester with conversion into proton form.

As used herein, the "equivalent weight" of an ionomer or ion exchange material refers to the weight of polymer (in molecular mass) in the ionomer per sulfonic acid group. Thus, a lower equivalent weight indicates a greater acid content. The equivalent weight (EW) of the ionomer refers to the EW if that ionomer were in its proton form at 0% RH with negligible impurities. The term "ion exchange capacity" refers to the inverse of equivalent weight (1/EW).

As used herein, the "equivalent volume" of an ionomer or ion exchange material refers to the volume of the ionomer per sulfonic acid group. The equivalent volume (EV) of the ionomer refers to the EV if that ionomer were pure and in its proton form at 0% RH, with negligible impurities.

As used herein, the terms "acid content" or "acid concentration" of a composite membrane refer to the sulfonic acid group content in the composite membrane and, unless otherwise indicated herein, is determined on a volume basis.

As used herein, the term "burst strength" refers to the pressure at which a film or sheet of the composite membrane like a PEM will burst. The bust strength of the PEM depends largely on the tensile strength and extensibility of the material that makes up the PEM.

As used herein, the term "microporous polymer structure" refers to a polymeric matrix that supports the ion exchange material, adding structural integrity and durability to the resulting composite membrane. In some exemplary embodiments, the microporous polymer structure comprises expanded polytetrafluoroethylene (ePTFE) having a node and fibril structure. In other exemplary embodiments, the microporous polymer structure comprises track etched polycarbonate membranes having smooth flat surfaces, high apparent density, and well defined pore sizes.

As used herein, an interior volume of a microporous polymer structure is referred to as "substantially occluded" when said interior volume has structures that is characterized by low volume of voids, less than 10% by volume, and being highly impermeable to gases, Gurley numbers larger than 10000 s. Conversely, interior volume of microporous polymer structure is referred to as "non-occluded" when said interior volume has structures that is characterized by large volume of voids, more than 10% by volume, and being permeable to gases, Gurley numbers less than 10000 s.

I. Composite Membranes

As shown in FIGS. 1A-1D, a composite membrane 100 is provided that includes a microporous polymer structure 105 and an ion exchange material (e.g. ionomer) 110 impregnated in the microporous polymer structure 105. That is, the microporous polymer structure 105 is imbibed with the ion exchange material 110. The ion exchange material 110 may substantially impregnate the microporous polymer structure 105 so as to render the interior volume substantially occlusive (i.e. the interior volume having structures that is characterized by low volume of voids and being highly impermeable to gases). For example, by filling greater than 90% of the interior volume of the microporous polymer structure 105 with the ion exchange material 110, substantial occlusion will occur and membrane will be characterized by Gurley numbers larger than 10000 s. As shown in FIGS. 1A-1D, the ion exchange material 110 is securely adhered to the internal and external surfaces of the microporous polymer structure 105, e.g., the fibrils and/or nodes of the microporous polymer structure forming an imbibed layer 104.

Figure 1B:
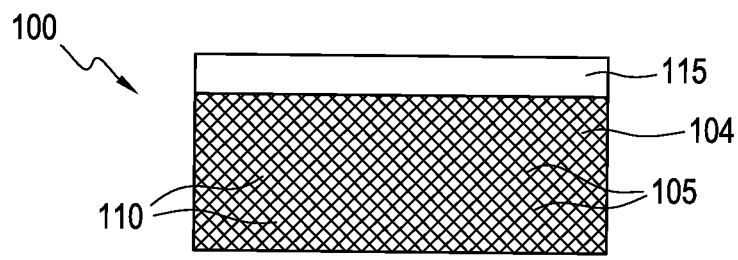
Figure 1C:
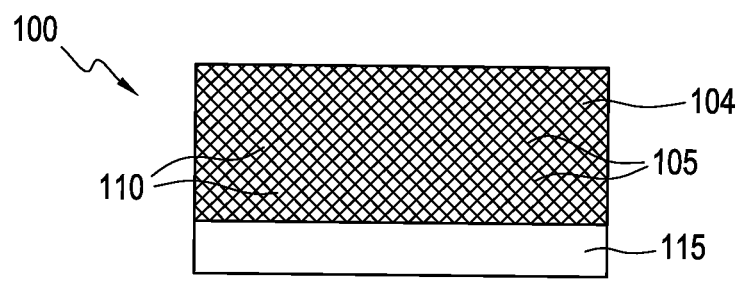
Figure 1D:
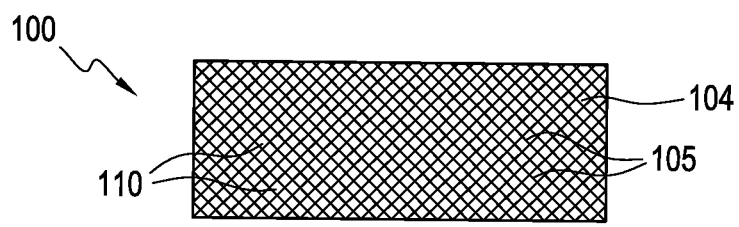

In some embodiments, the ion exchange material 110, in addition to being impregnated in the microporous polymer structure 105 in the imbibed layer 104, is provided as one or more additional layers 115 (e.g., referred also as "butter coat (BC)") on one or more external surfaces of the imbibed layer 104 (FIGS. 1A-1C). In other embodiments, the ion exchange material 110 is only provided impregnated in the microporous polymer structure 105 within the imbibed layer 104, i.e., without any additional layers, (FIG. 1D). Nonetheless, the composite membrane 100 is characterized by the microporous polymer structure 105 occupying greater than 13% of the total volume of the composite membrane 100, which total volume includes the volume of any additional layers 115, if present.

Figure 1E:
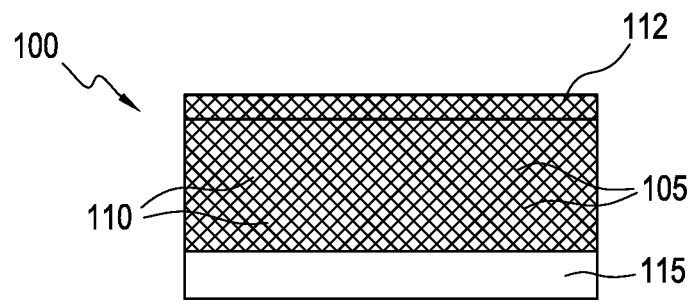
Figure 1F:
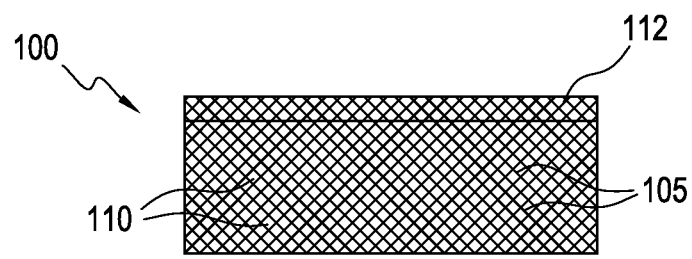

In additional embodiments, part of the microporous polymer structure 105 (e.g. top surface area or bottom surface area) may include a non-occlusive (i.e. the interior volume having structures that is characterized by high volume of voids and being highly permeable to gases) layer 112 that is free or substantially free of the ion exchange material 110 (FIGS. 1E-1F). The location of the non-occlusive layer 112 is not limited to the top surface area of the microporous polymer structure 105. As provided above, the non-occlusive layer 112 may be provided on a bottom surface area of the microporous polymer structure 105.

Yet in other embodiments, the non-occlusive layer 112 may include a small amount of the ion exchange material 110 present in an internal surface of the microporous polymer structure 105 as a thin node and fibril coating. However, the amount of the ion exchange material 110 may be not be large enough to render the microporous polymer structure 105 occlusive, thereby forming the non-occlusive layer 112.

Figure 1G:
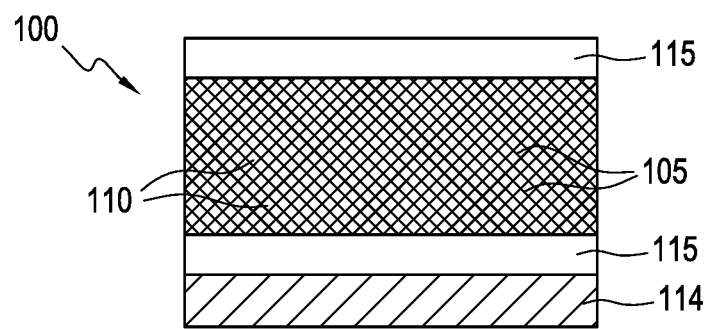

In some embodiments, the composite membrane 100 may be provided on a support layer 114 (FIG. 1G). The support layer 114 may include a backer, a release film such as, for example, cycloolefin copolymer (COC) layer. In some embodiments, the composite membrane 100 may be released (or otherwise uncoupled) from the support layer 114 prior to being incorporated in a membrane electrode assembly (MEA).

FIGS. 1A-1G illustrate exemplary composite membranes 100 that include a single type of ion exchange material 110. However, the application is not limited to composite membranes 100 having a single type of ion exchange material 110 or a single imbibed layer 104.

Figure 2A:
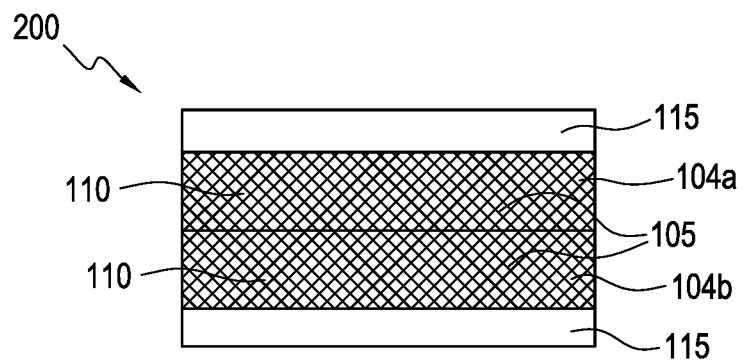
FIGS. 2A-2C show a cross sectional side view of a composite membrane in accordance with some aspects of the invention.
Figure 2B:
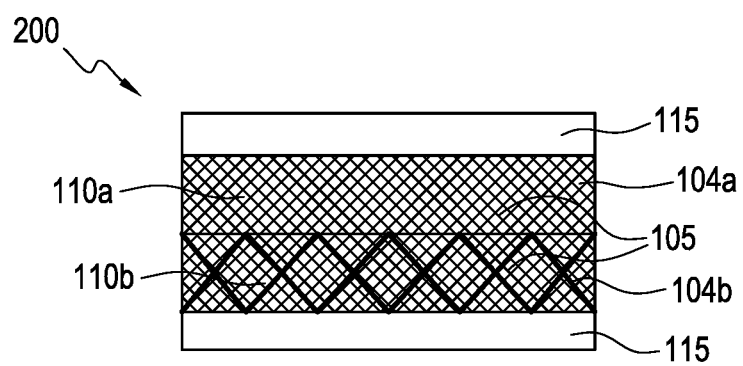
Figure 2C:
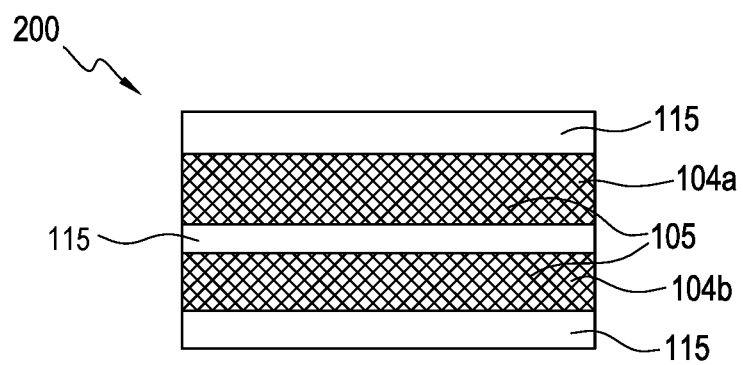

As illustrated in FIGS. 2A-2C, the composite membrane 200 may also include a plurality, e.g., two or more, imbibed layers 104a and 104b. In the embodiment of FIG. 2A, a first imbibed layer 104a may be formed by imbibing the microporous polymer structure 105 with the ion exchange material 110, and a second imbibed layer 104b may be formed by imbibing the microporous polymer structure 105 with the same ion exchange material 110. For example, ion exchange material may be imbibed into a first side of the microporous polymer structure to form the first imbibed layer 104a, and the same ion exchange material may be imbibed into a second side of the microporous polymer structure, opposite the first side, to form the second imbibed layer 104b. In the embodiment of FIG. 2B, the first imbibed layer 104a may be formed by imbibing the microporous polymer structure 105 with a first ion exchange material 110a, and the second imbibed layer 104b may be formed by imbibing the microporous polymer structure 105 with a second ion exchange material 110b that is different from the first ion exchange material 110a. In this aspect, a first ion exchange material may be imbibed into a first side of the microporous polymer structure to form the first imbibed layer 104a, and a second ion exchange material may be imbibed into a second side of the microporous polymer structure, opposite the first side, to form the second imbibed layer 104b.

In some embodiments, one or more of the ion exchange material 110, the first ion exchange material 110a and/or the second ion exchange material 110b may be provided as one or more additional layers 115 on one or more external surfaces of the imbibed layers 104a and/or 104b (FIGS. 2A-2C), including optionally between imbibed layers 104a and 104b, as shown in FIG. 2C.

Figure 2D:
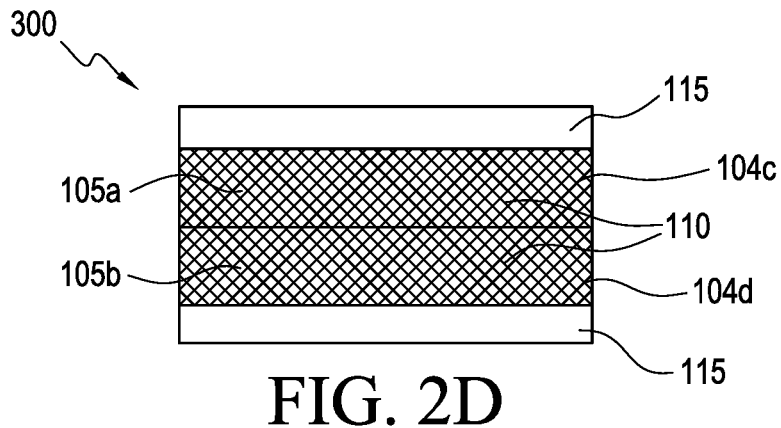
FIGS. 2D-2F show a cross sectional side view of a composite membrane in accordance with some aspects of the invention.
Figure 2E:
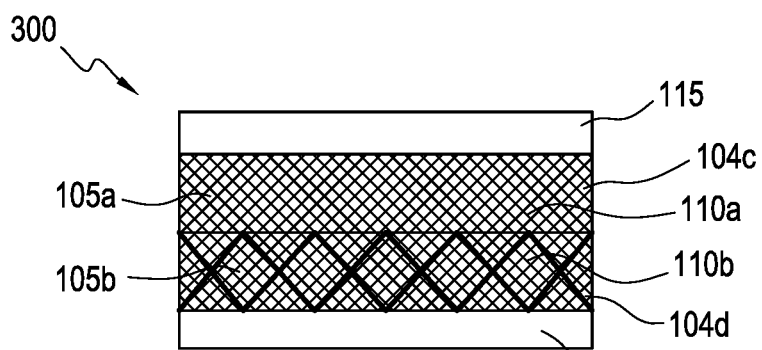
Figure 2F:
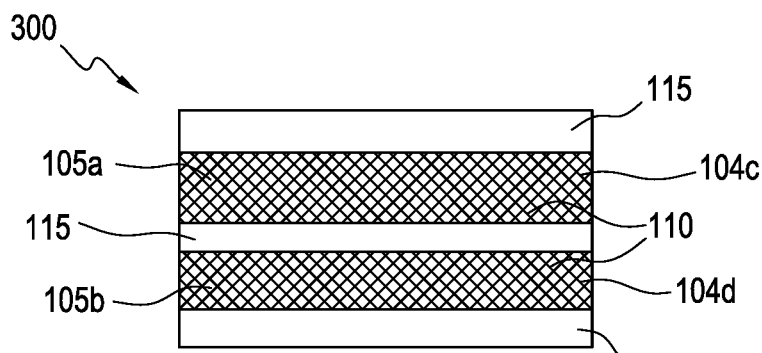

As illustrated in FIGS. 2D-2F, the composite membrane 300 may also include a plurality, e.g., two or more, imbibed layers 104c and 104d formed by two (or more) different microporous polymer structures 105a and 105b. In some embodiments, the first imbibed layer 104c may be formed by imbibing a first microporous polymer structure 105a with the ion exchange material 110, and the second imbibed layer 104b may be formed by imbibing a second microporous polymer structure 105b with the same ion exchange material 110 (FIG. 2D). In other embodiments, the first imbibed layer 104c may be formed by imbibing a first microporous polymer structure 105a with a first ion exchange material 110a, and the second imbibed layer 104b may be formed by imbibing a second microporous polymer structure 105b with a second ion exchange material 110b. As shown in FIGS. 2D-2F, the first microporous polymer structure 105a may be different than the second microporous polymer structure 105b. The first ion exchange material 110a may be the same as or different from the second ion exchange material 110b.

In some embodiments, the ion exchange material 110, the first ion exchange material 110a and the second ion exchange material 110b may be provided as one or more additional layers 115 on one or more external surfaces of the imbibed layers 104c and 104d such that the first microporous polymer structure 105a is in direct contact with the second microporous polymer structure 105b (FIGS. 2D-2E). In some embodiments, the ion exchange material 110, the first ion exchange material 110a and the second ion exchange material 110b may be provided as one or more additional layers 115 between the imbibed layers 104c and 104d such that the first microporous polymer structure 105a may not be in direct contact with the second microporous polymer structure 105b (FIG. 2F).

Microporous Polymer Structure

A suitable microporous polymer structure depends largely on the application in which the composite membrane is to be used. The microporous polymer structure preferably has good mechanical properties, is chemically and thermally stable in the environment in which the composite membrane is to be used, and is tolerant of any additives used with the ion exchange material for impregnation.

As used herein, the term "microporous" refers to a structure having pores that are not visible to the naked eye. According to various optional embodiments, the pores may have an average pore size from 0.01 to 100 microns, e.g., from 0.05 to 20 microns or from 0.1 to 1 microns.

As used herein, the term "microporous layer" is intended to refer to a layer having a thickness of at least 0.1 micron, optionally from 0.5 to 100 or from 1 to 50 microns, and having an average micropore size from 0.05 to 20 microns, e.g., from 0.1 to 1 microns.

A suitable microporous polymer structure 105 for fuel cell applications may include porous polymeric materials. The porous polymeric materials may include fluoropolymers, chlorinated polymers, hydrocarbons, polyamides, polycarbonates, polyacrylates, polysulfones, copolyether esters, polyethylene, polypropylene, polyvinylidene fluoride, polyaryl ether ketones, polybenzimidazoles, poly(ethylene-co-tetrafluoroethylene), poly(tetrafluoroethylene-co-hexafluoropropylene). In some embodiments, the microporous polymer structure 105 includes a perfluorinated porous polymeric material. The perfluorinated porous polymeric material may include polytetrafluoroethylene (PTFE), expanded polytetrafluoroethylene (ePTFE), polyvinylidene fluoride (PVDF), expanded polyvinylidene fluoride (ePVDF), expanded poly(ethylene-co-tetrafluoroethylene) (eEPTFE) or mixtures thereof.

In some embodiments, the microporous polymer structure 105 includes a hydrocarbon material. The hydrocarbon material may include polyethylene, expanded polyethylene, polypropylene, expanded polypropylene, polystyrene, polycarbonate, track etched polycarbonate or mixtures thereof. Examples of suitable perfluorinated porous polymeric materials for use in fuel cell applications include ePTFE made in accordance with the teachings of U.S. Pat. No. 8,757,395, which is incorporated herein by reference in its entirety, and commercially available in a variety of forms from W. L. Gore & Associates, Inc., of Elkton, Md.

Ion Exchange Material

A suitable ion exchange material may be dependent on the application in which the composite membrane is to be used. The ion exchange material preferably has a low equivalent weight (e.g., equal to or less than 460 cc/eq), and is chemically and thermally stable in the environment in which the composite membrane is to be used. A suitable ionomer for fuel cell applications may include an ion exchange material such as a cation exchange material, an anion exchange material, or an ion exchange material containing both cation and anion exchange capabilities. In some embodiments, the ion exchange material comprises a proton conducting polymer or cation exchange material. The ion exchange material may perfluorocarboxylic acid polymers, perfluorophosphonic acid polymers, styrenic ion exchange polymers, fluorostyrenic ion exchange polymers, polyarylether ketone ion exchange polymers, polysulfone ion exchange polymers, bis(fluoroalkylsulfonyl)imides, (fluoroalkylsulfonyl)(fluorosulfonyl)imides, polyvinyl alcohol, polyethylene oxides, divinyl benzene, metal salts with or without a polymer and mixtures thereof. Examples of suitable perfluorosulfonic acid polymers for use in fuel cell applications include Nafion® (E.I. DuPont de Nemours, Inc., Wilmington, Del., US), Flemion® (Asahi Glass Co. Ltd., Tokyo, JP), Aciplex® (Asahi Chemical Co. Ltd., Tokyo, JP), Aquivion® (SolvaySolexis S.P.A, Italy), and 3M™ (3M Innovative Properties Company, USA) which are commercially available perfluorosulfonic acid copolymers. Other examples of suitable perfluorosulfonic acid polymers for use in fuel cell applications include perfluorinated sulfonyl (co)polymers such as those described in U.S. Pat. No. 5,463,005.

Properties of the Composite Membrane

As discussed below, the composite membrane 100, 200, 300 comprises microporous polymer structure 105 and ion exchange material 110 imbibed into the microporous polymer structure thereby forming two distinct materials that achieve improved durability and selectivity of the composite membrane 100, 200, 300. The durability is influenced by the volume of the microporous polymer structure 105 compared to the total volume of the composite membrane 100, 200, 300. The durability of the composite membrane is measurable as burst strength, which may be greater than 0.2 N, e.g., greater than 0.5 N or greater than 1 N, for example, from 0.2 N to 10 N, from 1 to 10 N.

To achieve high selectivity, the conductance may be high and the permeance may be low. In some exemplary aspects, the conductance of the composite membrane is measurable as ion conductivity per unit thickness (e.g., proton conductance). The conductance is optionally greater than 1 Siemens/cm$^2$, e.g., greater than 10 Siemens/cm$^2$ or greater than 14 Siemens/cm$^2$, as determined by proton conductance test described herein at 50% relative humidity. The permeance of the composite membrane may be measurable as permeability per unit thickness (e.g. hydrogen permeance). The permeance is optionally less than 400 mA/(Mpa*cm$^2$), e.g. less than 300 mA/(Mpa*cm$^2$) or less than 190 mA/(Mpa*cm$^2$), as determined by hydrogen permeance test described herein at 50% relative humidity. In some embodiments, the selectivity of the composite membrane is greater than 0.05 MPa/mV, e.g. greater than 0.2 MPa/mV or greater than 0.35 MPa/mV or greater than 0.5 MPa/mV, based on the conductance and permeance of the composite membrane at 50% relative humidity. In terms of ranges, the selectivity is optionally from 0.05 to 5 MPa/mV, e.g. from 0.2 to 5 MPa/mV or from 0.4 to 5 MPa/mV or from 1 to 5 MPa/mV.

The durability and selectivity of the composite membrane 100, 200, 300 are achievable in accordance with various aspects of the present disclosure while maintaining present levels of conductance and an ultra-thin profile that customers are accustomed to having. In particular, increasing the relative volume of the microporous polymer structure 105 to achieve a desired durability can: (i) increase the thickness of the composite membrane 100, 200, 300, which detracts from an ultra-thin profile; and/or (ii) adversely affect the acid content of the composite membrane 100, 200, 300, which impairs conductance. By utilizing two distinct materials (i.e., the microporous polymer structure and the ionomer), however, coupled with an ionomer having the desired equivalent weight characteristics, the volume of the microporous polymer structure is able to be increased relative to the total volume of the composite membrane and thus improve durability. Moreover, the ionomer maintains a low equivalent weight in the composite membrane, which compensates for dilution of the ionomer caused by the increase in volume of the microporous polymer structure, thereby conserving overall membrane acid content and overall composite membrane thickness.

In some embodiments, the microporous polymer structure 105 occupies greater than 13% of a total volume of the composite membrane, e.g., greater than 18% or greater than 30% at 0% relative humidity. In other embodiments, the microporous polymer structure 105 occupies from 13% to 65%, from 13% to 45%, e.g., from 18 to 36% or from 18 to 28%, of the total volume of the composite membrane at 0% relative humidity. In some embodiments, the equivalent volume of the ion exchange material 110 is equal to or less than 460 cc/eq, for example from 255 cc/mole eq to 460 cc/mole eq. In various embodiments, the acid content of the composite membrane 100, 200, 300 is greater than 1.2 meq/cc, for example from 1.2 meq/cc to 3.5 meq/cc at 0% relative humidity. In various embodiments, the thickness of the composite membrane 100, 200, 300 is less than 17 microns, for example from 1 microns to 17 microns at 0% relative humidity. Specifically, according to embodiments, the thickness of the composite membrane 100, 200, 300 is below a threshold thickness of 17 microns while the acid content of the composite membrane 100, 200, 300 is kept between 1.2 meq/cc to 3.5 meq/cc.

The volume % of the microporous polymer structure in the composite material refers to the space occupied by the microporous polymer structure nodes and fibrils, which is free of the ionomer. Accordingly, the volume % of the microporous polymer structure in the composite material is different than the imbibed layer which contains ionomer. The volume % of the microporous polymer structure in the composite material is affected by the humidity. Therefore, the experiments discussed below are conducted at dry conditions (e.g. 50% relative humidity (RH)).

The equivalent weight of the ion exchange material is also affected by the humidity. Therefore, the experiments discussed below are conducted at dry conditions at an ideal state were presence of water does not affect the value of equivalent volume and meaningful comparison between different ionomers can be drawn.

The total acid concentration of the composite membrane is a calculated based on volume rather than weight in order to provide a way for meaningful comparison between composite membranes comprising ionomers and microporous polymer structures of different densities. As provided above, weight-based measurements have significant limitations when correlated to proton conductivity in part because different polymers have significantly different densities. In addition, conduction occurs over length scales and, as such, it is more appropriately represented by volume-based measurements rather than weight-based measurements. The total acid concentration is averaged over the entire composite membrane. Since the total acid concentration is also affected by humidity, the experiments discussed below are conducted at dry conditions (e.g. 50% relative humidity (RH)) at an ideal (e.g. clean) state.

It is understood that the selectivity of the composite membrane may be increased by increasing the overall acid content. However, increasing the overall acid content lowers mechanical durability of the composite membrane. Therefore increasing acid content is not a preferred way to achieve increased selectivity.

As provided above, it is surprising and unexpected that the selectivity of the composite membrane is dramatically improved by increasing the microporous polymer structure content while holding the apparent equivalent weight constant. The improvement in selectivity is achieved by increasing the microporous structure content in the composite membrane, while keeping the thickness and the acid content of the composite material at/within predetermined ranges. That is, embodiments provide a composite membrane which is composed of 13 vol % to 65 vol % of microporous structure, which has a predetermined thickness (i.e. less than 17 microns thick) while having acid content between 1.2 meq/cc to 3.5 meq/cc.

Figure 3A:
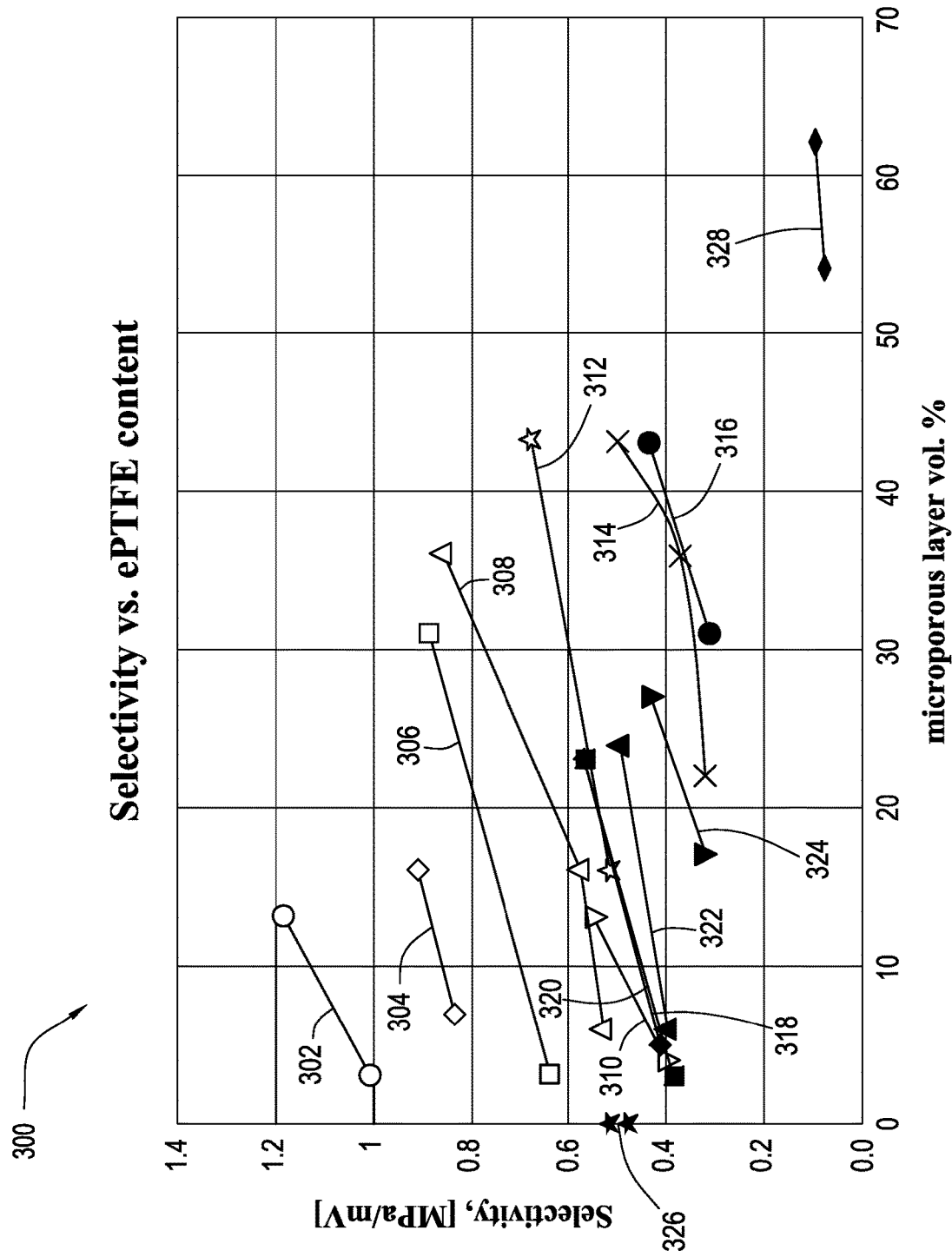
FIGS. 3A-3B show a graph illustrating certain properties of the composite membrane in accordance with some aspects of the invention.
Figure 3B:
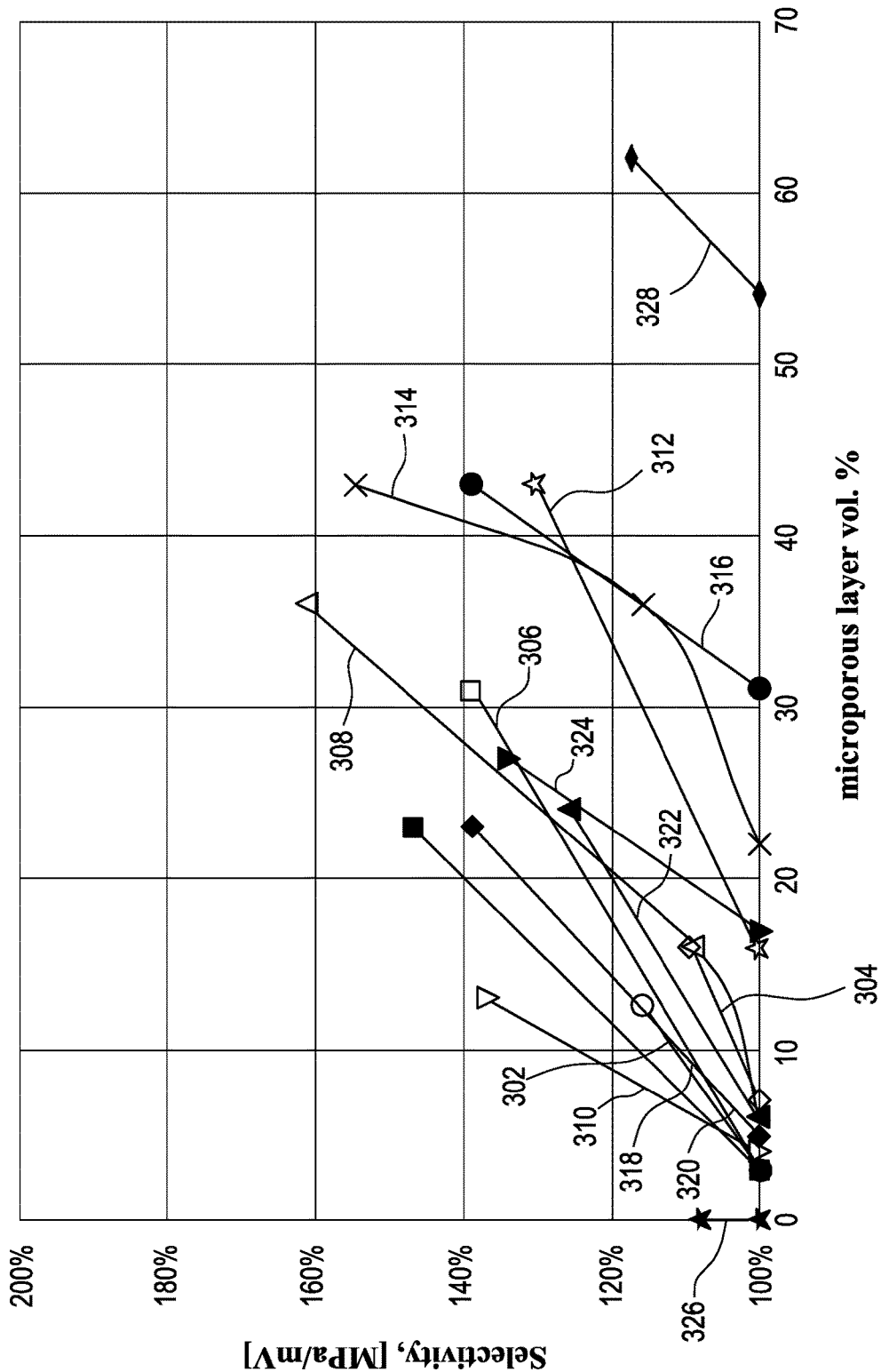

The improvement of the selectivity is illustrated in FIGS. 3A-3B that provide graphs 300 and 350 comparing the selectivity of a comparable composite membrane with the selectivity of an inventive composite membrane. Referring to FIG. 3A, each line 302-328 is associated with selectivity data of each series of examples, discussed below in greater detail. Specifically, each line 302-328 connects the selectivity data point of a comparable example with selectivity data point(s) of corresponding inventive example(s). Accordingly, the lines themselves are provided to guide the eye and do not represent data themselves. The data for the 13$^{th}$ series of examples does not have an inventive example and, as such, the selectivity of the comparative example is represented with a single selectivity data point as opposed to a line. As shown in graph 300, the selectivity of the composite membrane in each inventive example is dramatically improved compared to the selectivity of the composite membrane of the corresponding comparative example.

FIG. 3B illustrates the selectivity data normalized to comparative examples. Accordingly, in graph 350 illustrated in FIG. 3B, the selectivity of the comparative example for each exemplary series is normalized to zero. The selectivity of the inventive example(s) in each series is illustrated with a data point, and connected to the selectivity of the corresponding comparative example. As shown in graph 350, the selectivity of the composite membrane in each inventive example is dramatically improved compared to the selectivity of the composite membrane of the corresponding comparative example.

II. Processes for Preparing the Composite Membranes

Figure 4C:
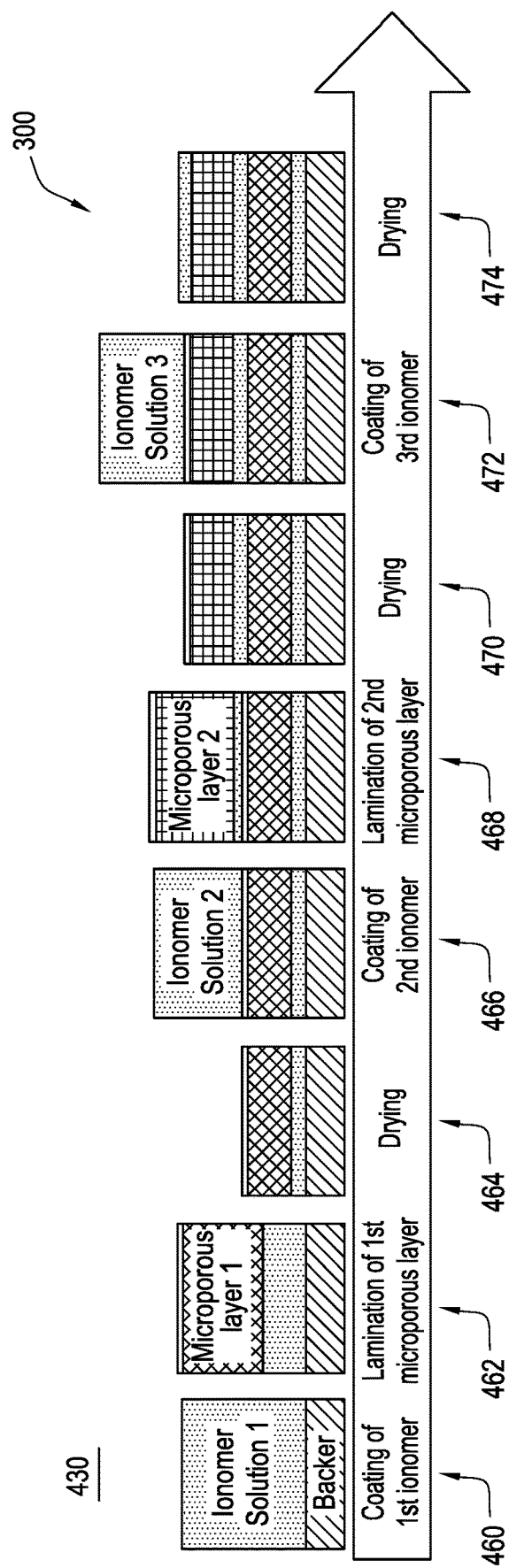

FIGS. 4A-4C show exemplary flow diagrams of processes 410, 420 and 430 for constructing exemplary composite membranes (e.g., the composite membrane 100 discussed with respect to FIGS. 1A-1G, the composite membrane 200 discussed with respect to FIGS. 2A-2C or the composite membrane 300 discussed with respect to FIGS. 2D-2F) in accordance with various aspects of the disclosure. The flow diagrams illustrate the architecture, functionality, and operation of possible implementations of systems and methods according to various embodiments of the present disclosure. In some alternative implementations, where it makes logical sense to do so, the functions noted in each block may occur out of the order noted in the figure. For example, two blocks shown in succession may, in fact, be executed substantially concurrently, or the blocks may sometimes be executed in the reverse order, depending upon the functionality, process, or end product involved.

Referring to FIG. 4A, exemplary flow diagram of process 410 illustrates a method for forming a composite material having a fully imbibed microporous polymer structure and two additional layers of ion exchange material. The process 410 incudes providing a support structure like a backer. Suitable support structures may comprise woven materials which may include, for example, scrims made of woven fibers of expanded porous polytetrafluoroethylene; webs made of extruded or oriented polypropylene or polypropylene netting, commercially available from Conwed, Inc. of Minneapolis, Minn.; and woven materials of polypropylene and polyester, from Tetko Inc., of Briarcliff Manor, N.Y. Suitable non-woven materials may include, for example, a spun-bonded polypropylene from Reemay Inc. of Old Hickory, Tenn. In other aspects, the support structure can include web of polyethylene ("PE"), polystyrene ("PS"), cyclic olefin copolymer ("COC"), cyclic olefin polymer ("COP"), fluorinated ethylene propylene ("FEP"), perfluoroalkoxy alkanes ("PFAs"), ethylene tetrafluoroethylene ("ETFE"), polyvinylidene fluoride ("PVDF"), polyetherimide ("PEI"), polysulfone ("PSU"), polyethersulfone ("PES"), polyphenylene oxide ("PPO"), polyphenyl ether ("PPE"), polymethylpentene ("PMP"), polyethyleneterephthalate ("PET"), or polycarbonate ("PC"). In some aspects, the support structure also includes a protective layer, which can include polyethylene (PE), polystyrene ("PS"), cyclic olefin copolymer ("COC"), cyclic olefin polymer ("COP"), fluorinated ethylene propylene ("FEP"), perfluoroalkoxy alkanes ("PFAs"), ethylene tetrafluoroethylene ("ETFE"), polyvinylidene fluoride ("PVDF"), polyetherimide ("PEI"), polysulfone ("PSU"), polyethersulfone ("PES"), polyphenylene oxide ("PPO"), polyphenyl ether ("PPE"), polymethylpentene ("PMP"), polyethyleneterephthalate ("PET"), or polycarbonate ("PC"). In yet other aspects, support structure can include support structure optionally may include a reflective layer that includes a metal substrate (e.g., an aluminum substrate). The specific metal chosen may vary widely so long as it is reflective. A non-limiting list of exemplary metals includes: aluminum, beryllium, cerium, chromium, copper, germanium, gold, hafnium, manganese, molybdenum, nickel, platinum, rhodium, silver, tantalum, titanium, tungsten, zinc, or alloys such as Inconel or bronze. The reflective layer optionally comprises a mixture or alloy of two or more metals, optionally two or more of the metals listed above. The reflective layer optionally can include a high reflectivity polymeric multilayer film such as Vikuiti™ Enhanced Specular Reflector available from 3M company. In yet another example, the reflective layer optionally can include a high reflectivity non-metal inorganic dielectric multilayer film comprised of materials such as, for example, magnesium fluoride, calcium fluoride, titanium dioxide, silicon dioxide.

At step 440, a first ionomer solution is applied as a layer of controlled thickness to the support structure in a single or multiple pass ionomer coating technique including forward roll coating, reverse roll coating, gravure coating, doctor coating, kiss coating, slot die coating, slide die coating, as well as dipping, brushing, painting, and spraying. The first ionomer solution may be prepared by dissolving an ion exchange material in a solvent. The first ionomer solution may comprise ion exchange material and a solvent, and optionally additional components such as a surfactant. In some embodiments, the ion exchange material is a cation exchange material, an anion exchange material, or an ion exchange material containing both cation and anion exchange capabilities. The choice of solvent may depend, in part, on both the composition of the ionomer and the composition of the porous substrate.

At step 442, an untreated microporous polymer structure is laminated over at least a portion of the first ionomer solution by any conventional technique, such as, for example, hot roll lamination, ultrasonic lamination, adhesive lamination, contact lamination or forced hot air lamination so long as the technique does not damage the integrity of the untreated microporous polymer structure. In some embodiments, the untreated microporous polymer structure comprises ePTFE having a microporous polymer structure. The microporous polymer structure can be characterized by uniform structure and composition throughout its entire thickness. In other aspects, structure and composition of microporous polymer structure can vary throughout its thickness. The prepared or obtained microporous polymer structure may have a thickness of less than 200 microns, for example from 1 microns to 50 microns at 0% relative humidity. The mass per unit area of the untreated microporous polymer structure may be greater than 0.05 g/m$^2$, for example from 0.3 g/m$^2$ to 20 g/m$^2$ at 0% relative humidity.

For example, a carrier support like a backer can be continuously fed from a roller unwind station via alignment and tension rollers to a coating station. The ionomer solution can be applied as a layer of controlled thickness onto the surface of the carrier support (backer) by suitable coating means, such as, for example, a doctor blade. The untreated microporous polymer structure may be continuously fed from a roller unwind station to an alignment roller and contacts the coated carrier support and is impregnated with ionomer solution. Alternatively, the carrier support can be eliminated and the layer of ionomer solution can be directly applied to the untreated microporous polymer structure.

At step 444, the treated microporous polymer structure is placed into an oven to dry and finalize construction of a composite membrane. The oven temperature may be greater than 60° C., for example from 60° to 200° C. or from 120° to 180° C. Drying the treated microporous polymer structure in the oven causes the ion exchange material to become securely adhered to the internal membrane surfaces, and optionally the external membrane surfaces, e.g., the fibrils and/or nodes of the microporous polymer structure. The resulting dried composite membrane may have a thickness of less than 17 microns, for example from 0.1 microns to 17 microns at 0% relative humidity. The mass of the composite membrane may be greater than 0.2 g/m$^2$, for example from 0.2 g/m$^2$ to 40 g/m$^2$ at 0% relative humidity.

At step 446, a second ionomer solution may be coated over the dried composite material. Similar to step 440, the second ionomer solution may be applied as a layer of controlled thickness to the composite material in a single or multiple pass ionomer coating technique including forward roll coating, reverse roll coating, gravure coating, doctor coating, kiss coating, slot die coating, slide die coating, as well as dipping, brushing, painting, and spraying. The second ionomer solution may be prepared by dissolving an ion exchange material in a solvent. The second ionomer solution may comprise ion exchange material and a solvent, and optionally additional components such as a surfactant. In some embodiments, the ion exchange material is a cation exchange material, an anion exchange material, or an ion exchange material containing both cation and anion exchange capabilities. In some embodiments, the second ionomer solution may be the same as the first ionomer solution. Alternatively, the second ionomer solution may be different than the first ionomer solution.

At step 448, the structure is placed into an oven to dry and finalize construction of the composite membrane 100, similar to step 444.

Referring now to FIG. 4B, exemplary flow diagram of process 420 illustrates a method for forming a composite material having two fully imbibed microporous polymer structures in contact with each other and two additional layers of ion exchange material. The process 420 incudes providing a support structure (e.g. backer), such as a woven material, similar to the process 410.

At step 450, a first ionomer solution is applied as a layer of controlled thickness to the support structure (backer) similar to step 440 of the process 410. The description of step 450 is omitted here as it is identical to step 440 of the process 410, described above.

At step 452, a first untreated microporous polymer structure (layer 1) is laminated over a first portion of the first ionomer solution and a second untreated microporous polymer structure (layer 2) is laminated over the same portion of first ionomer solution on top of layer 1 by any conventional technique, such as, hot roll lamination, ultrasonic lamination, adhesive lamination, contact lamination or forced hot air lamination so long as the technique does not damage the integrity of the untreated microporous polymer structures. In some embodiments, the first and second untreated microporous polymer structures comprise ePTFE having a microporous polymer structure. In some embodiments, the second untreated microporous polymer structure may be the same as the first untreated microporous polymer structure. Alternatively, the second untreated microporous polymer structure may be different than the first untreated microporous polymer structure. The first and second microporous polymer structure can be characterized by uniform structure and composition throughout its entire thickness. In other aspects, structure and composition of first and second microporous polymer structure can vary throughout its thickness.

Steps 454-458 are similar to steps 444-448 of the process 410. Accordingly, the description of steps 454-458 is omitted here. The dried prepared or obtained microporous polymer structure may have a thickness of less than 200 microns, for example from 1 microns to 50 microns at 0% relative humidity. The mass per unit area of the untreated microporous polymer structure may be greater than 0.05 g/m$^2$, for example from 0.3 g/m$^2$ to 20 g/m$^2$ at 0% relative humidity.

Referring now to FIG. 4C, exemplary flow diagram of process 430 illustrates a method for forming a composite material having two fully imbibed microporous polymer structure layers and two additional layers of ion exchange material and that are separated from each other by another layer of ion exchange material The process 430 incudes providing a support structure (e.g. backer), such as a woven material, similar to processes 410 and 420.

Steps 460-466 of the process 430 are identical to steps 440-446 of the process 410, respectively. Accordingly, the description of steps 460-466 is omitted here.

At step 468, a second untreated microporous polymer structure is laminated over at least a portion of the second ionomer solution by any conventional technique, such as, hot roll lamination, ultrasonic lamination, adhesive lamination, contact lamination, or forced hot air lamination so long as the technique does not damage the integrity of the untreated porous substrate. In some embodiments, the second untreated microporous polymer structure comprises ePTFE having a microporous polymer structure. In some embodiments, the second untreated microporous polymer structure may be the same as the first untreated microporous polymer structure. Alternatively, the second untreated microporous polymer structure may be different than the first untreated microporous polymer structure. The first and second microporous polymer structure can be characterized by uniform structure and composition throughout its entire thickness. In other aspects, structure and composition of first and second microporous polymer structure can vary throughout its thickness.

At step 470, the treated microporous polymer structure is placed into an oven to dry, similar to step 444 of the process 410. The prepared or obtained microporous polymer structure may have a thickness of less than 200 microns, for example from 1 microns to 50 microns at 0% relative humidity. The mass per unit area of the untreated microporous polymer structure may be greater than 0.05 g/m$^2$, for example from 0.3 g/m$^2$ to 20 g/m$^2$ at 0% relative humidity.

At step 474, a third ionomer solution may be coated over the dried composite material, similar to step 460. In some embodiments, the third ionomer solution may be the same as the first and/or the second ionomer solutions. Alternatively, the third ionomer solution may be different than the first and second ionomer solutions.

At step 474, the treated microporous polymer structure is placed into an oven to dry and finalize construction of the composite membrane 300, similar to step 448.

The processes 410, 420 and 430 may be repeated as desired in order to form a multi-layer composite membrane.

III. MEA and a Fuel Cell

Figure 5A:
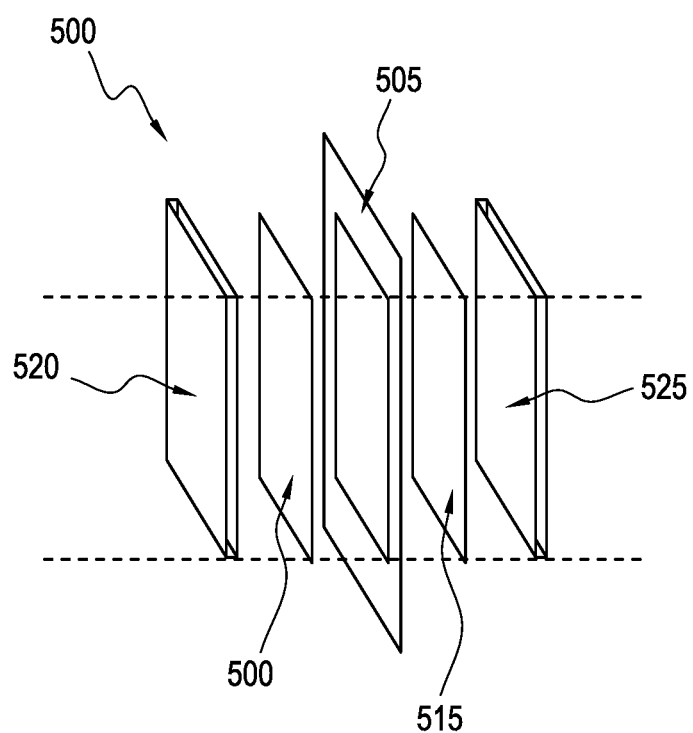
FIG. 5A shows a diagram of an MEA comprising a composite membrane in accordance with some aspects of the invention.
Figure 5B:
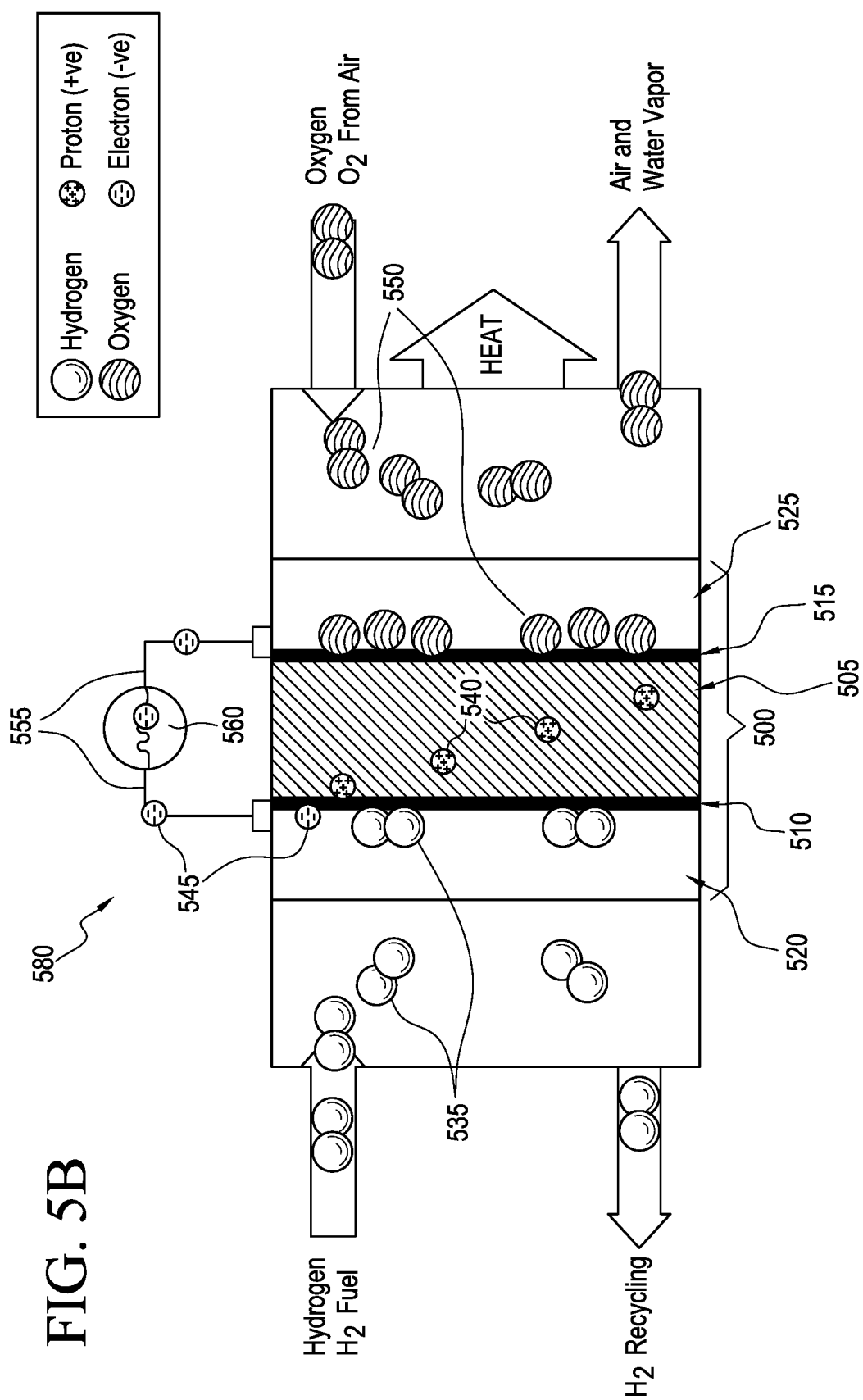
FIG. 5B shows a diagram of a fuel cell comprising a composite membrane in accordance with some aspects of the invention.

As shown in FIGS. 5A and 5B, a composite membrane as discussed with respect to FIGS. 1A-2F and constructed as described in FIGS. 4A-4C may be incorporated into an MEA 500 and fuel cell 580. In some embodiments, a composite membrane as discussed with respect to FIGS. 1A-2F and constructed as described in FIGS. 4A-4C may be incorporated into a redox flow battery.

As shown in FIG. 5A, in some embodiments, MEA 500 includes a composite membrane 505 (e.g., composite membrane 100, 200, 300) sandwiched between two electrodes 510, 515 imbibed with catalyst. The electrodes 510, 515 are electrically insulated from each other by the composite membrane 505 and make up the anode 510 and cathode 515 of the MEA 500. Optionally, the MEA 500 may further comprise gas diffusion layers 520, 525 such as carbon paper or carbon cloth.

As shown in FIG. 5B, in some embodiments, a fuel cell 580 comprises a MEA 500 that includes a composite membrane 505 (e.g., composite membrane 100, 200, 300) sandwiched between an anode 510 and a cathode 515 imbibed with catalyst. Optionally, the MEA 500 may further comprise gas diffusion layers 520, 525 such as carbon paper or carbon cloth. The anode 510 is configured to oxidize a fuel 535 (e.g., hydrogen fuel), which turns into ions 540 and electrons 545. The ions 540 are able to diffuse through the composite membrane 505 to the cathode 515. Once the ions 540 reach the cathode 515, the ions 540 react with an oxidant 550 (e.g., oxygen) to produce water. The electrons 545 are able to pass through circuit 555 producing electricity. Accordingly, electricity is formed at a load 560 and water is obtained as the by-product.

IV. Examples a. Test Procedures and Measurement Protocols Used in Examples

Bubble Point

The Bubble Point was measured according to the procedures of ASTM F316-86. Isopropyl alcohol was used as the wetting fluid to fill the pores of the test specimen. The Bubble Point is the pressure of air required to create the first continuous stream of bubbles detectable by their rise through the layer of isopropyl alcohol covering the microporous polymer matrix. This measurement provides an estimation of maximum pore size.

Gurley Number

Gas flow barrier properties were measured using Gurley Densometer according to ASTM D-726-58. The procedure includes clamping sample between air permeable plates of the Gurley Densometer. An inner cylinder of known weight that can slide freely is then released. The Gurley number is defined as time in seconds it takes for the released inner cylinder to displace a certain volume of air in the Densometer through the sample material.

Gas Permeability (ATEQ)

An ATEQ Corp. Premier D Compact Flow Tester was used to measure the flowrate of air (in liters/hour) through each microporous polymer structure when challenged with a differential pressure of 1.2 kPa (12 mbar). The samples were clamped between two plates in a manner that defined a cross sectional area of 2.9 cm$^2$ for the flow path.

Non-Contact Thickness

A sample of microporous polymer structure was placed over a flat smooth metal anvil and tensioned to remove wrinkles. Height of microporous polymer structure on anvil was measured and recorded using a non-contact Keyence LS-7010M digital micrometer. Next, height of the anvil without microporous polymer matrix was recorded. Thickness of the microporous polymer structure was taken as a difference between micrometer readings with and without microporous structure being present on the anvil.

Mass-Per-Area

Each Microporous Polymer structure was strained sufficient to eliminate wrinkles, and then a 10 cm$^2$ piece was cut out using a die. The 10 cm$^2$ piece was weighed on a conventional laboratory scale. The mass-per-area (M/A) was then calculated as the ratio of the measured mass to the known area. This procedure was repeated 2 times and the average value of the M/A was calculated.

Apparent Density of Microporous Layer

Apparent density of microporous polymer structure was calculated using the non-contact thickness and mass-per-area data using the following formula:

$$\text{Apparent density}_{microporous\ layer} = \frac{\{M/A_{microporous\ layer}\}}{\{\text{non-contact thickness}\}} = [g/cc]$$

Solids Concentration of Solutions of Ion Exchange Material (IEM)

Herein, the terms "solution" and "dispersion" are used interchangeably when referring to IEMs. This test procedure is appropriate for solutions in which the IEM is in proton form, and in which there are negligible quantities of other solids. A volume of 2 cubic centimeters of IEM solution was drawn into a syringe and the mass of the syringe with solution was measured via a balance in a solids analyzer (obtained from CEM Corporation, USA). The mass of two pieces of glass fiber paper (obtained from CEM Corporation, USA) was also measured and recorded. The IEM solution was then deposited from the syringe into the two layers of glass fiber paper. The glass fiber paper with the ionomer solution was placed into the solids analyzer and heated up to 160° C. to remove the solvent liquids. Once the mass of the glass fiber paper and residual solids stopped changing with respect to increasing temperature and time, it was recorded. It is assumed that the residual IEM contained no water (i.e., it is the ionomer mass corresponding to 0% RH). After that, the mass of the emptied syringe was measured and recorded using the same balance as before. The ionomer solids in solution was calculated according to the following formula:

$$\left\{\begin{array}{c}\text{wt \% solids of}\\ \text{IEM solution}\end{array}\right\} = \frac{\left\{\begin{array}{c}\text{Mass of glass fiber paper}\\ \text{with residual solids}\end{array}\right\} - \{\text{Mass of glass fiber paper}\}}{\{\text{Mass of full syringe}\} - \{\text{Mass of emptied syringe}\}} = [\text{wt \%}]$$

Equivalent Weight (EW) of an IEM

The following test procedure is appropriate for IEM comprised of a single ionomer resin or a mixture of ionomer resins that is in the proton form (i.e., that contains negligible amounts of other cations), and that is in a solution that contains negligible other ionic species, including protic acids and dissociating salts. If these conditions are not met, then prior to testing the solution must be purified from ionic impurities according to a suitable procedure as would be known to one of ordinary skill in the art, or the impurities must be characterized and their influence on the result of the EW test must be corrected for.

As used herein, the EW of an IEM refers to the case when the IEM is in its proton form at 0% RH with negligible impurities. The IEM may comprise a single ionomer or a mixture of ionomers in the proton form. An amount of IEM solution with solids concentration determined as described above containing 0.2 grams of solids was poured into a plastic cup. The mass of the ionomer solution was measured via a conventional laboratory scale (obtained from Mettler Toledo, LLC, USA). Then, 5 ml of deionized water and 5 ml of 200 proof denatured ethanol (SDA 3C, Sigma Aldrich, USA) is added to ionomer solution in the cup. Then, 55 ml of 2N sodium chloride solution in water was added to the IEM solution. The sample was then allowed to equilibrate under constant stirring for 15 minutes. After the equilibration step, the sample was titrated with 1N sodium hydroxide solution. The volume of 1N sodium hydroxide solution that was needed to neutralize the sample solution to a pH value of 7 was recorded. The EW of the IEM ($EW_{IEM}$) was calculated as:

$$EW_{IEM} = \frac{\left\{\begin{array}{c}\text{Mass of}\\ \text{IEM solution}\end{array}\right\} \times \left\{\begin{array}{c}\text{wt \% solids of}\\ \text{IEM solution}\end{array}\right\}}{\left\{\begin{array}{c}\text{Volume of}\\ \text{NaOH solution}\end{array}\right\} \times \left\{\begin{array}{c}\text{Normality of}\\ \text{NaOH solution}\end{array}\right\}} = \left[\frac{g}{\text{mole eq.}}\right]$$

When multiple IEMs were combined to make a composite membrane, the average EW of the IEMs in the composite membrane was calculated using the following formula:

$$EW_{IEM\_average} = \left[\frac{\left\{\begin{array}{c}\text{Mass fraction}\\ \text{of IEM 1}\end{array}\right\}}{\{EW_{IEM,1}\}} + \frac{\left\{\begin{array}{c}\text{Mass fraction}\\ \text{of IEM 2}\end{array}\right\}}{\{EW_{IEM,2}\}} + \ldots \cdot \frac{\left\{\begin{array}{c}\text{Mass fraction}\\ \text{of IEM N}\end{array}\right\}}{\{EW_{IEM,N}\}}\right]^{-1} = \left[\frac{g}{\text{mole eq.}}\right],$$

where the mass fraction of each IEM is with respect to the total amount of all IEMs. This formula was used both for composite membranes containing ionomer blends and for composite membranes containing ionomer layers.

Equivalent Volume (EV) of Ion Exchange Material

As used herein, the Equivalent Volume of the IEM refers to the EV if that IEM were pure and in its proton form at 0% RH, with negligible impurities. The EV was calculated according to the following formula:

$$EV_{IEM} = \frac{\{\text{Equivalent Weight of IEM}\}}{\{\text{Volumetric density of IEM at 0\% RH}\}} = \left[\frac{cc}{\text{mole eq.}}\right]$$

The Equivalent Weight of each IEM was determined in accordance with the procedure described above. The IEMs used in these application were perfluorosulfonic acid ionomer resins the volumetric density of perfluorosulfonic acid ionomer resin was taken to be 1.96 g/cc at 0% RH.

Thickness of Composite Membrane

The composite membranes were equilibrated in the room in which the thickness was measured for at least 1 hour prior to measurement. Composite membranes were left attached to the substrates on which the composite membranes were coated. For each sample, the composite membrane on its coating substrate was placed on a smooth, flat, level marble slab. A thickness gauge (obtained from Heidenhain Corporation, USA) was brought into contact with the composite membrane and the height reading of the gauge was recorded in six different spots arranged in grid pattern on the membrane. Then, the sample was removed from the substrate, the gauge was brought into contact with the substrate, and the height reading was recorded again in the same six spots. The thickness of the composite membrane at a given relative humidity (RH) in the room was calculated as a difference between height readings of the gauge with and without the composite membrane being present. The local RH was measured using an RH probe (obtained from Fluke Corporation). The thickness at 0% RH was calculated using the following general formula:

$$\text{Thickness at 0\% } RH = \left( \frac{\text{Thickness at room } RH - \frac{M/A_{porous\ layer}}{\text{Density}_{porous\ layer}}}{1 + \frac{\lambda_{room\ RH}}{EW_{ionomer\_average}} * \frac{\text{Molecular weight}_{water}}{\text{Density}_{water}} * \text{Density}_{ionomer}} \right) **$$

$$\left( 1 + \frac{\lambda_{RH=0\%}}{EW_{ionomer_{average}}} * \frac{\text{Molecular weight}_{water}}{\text{Density}_{water}} * \text{Density}_{ionomer} \right) +$$

$$\frac{M/A_{porous\ layer}}{\text{Density}_{porous\ layer}} = [\text{micron}]$$

where the parameter λ corresponds to the water uptake of the Ion Exchange Material in terms of moles of water per mole of acid group at a specified RH. For PFSA ionomer, the values for λ at any RH in the range from 0 to 100% in gas phase were calculated according the following formula:

$\lambda = 80.239 \times RH^6 - 38.717 \times RH^5 - 164.451 \times RH^4 + 208.509 \times RH^3 - 91.052 \times RH^2 + 21.740 \times RH^1 + 0.084$ Microporous Polymer Matrix (MPM) Volume content of composite membrane The volume % of the Microporous Polymer Matrix in each Composite Membrane was calculated according to the following formula:

$$\% \text{Vol}_{MPM} = \frac{\left( \frac{M/A_{porous\ layer}}{\text{Matrix skeletal density}_{MPM}} \right)}{\text{Composite Membrane thickness at 0\% } RH} = [\%]$$

The Microporous Polymer Matrices used in these examples were ePTFE and track etched porous polycarbonate. The matrix skeletal density of ePTFE was taken to be 2.25 g/cc and of track etched porous polycarbonate was taken to be 1.20 g/cc.

Acid Content of Composite Membrane

Acid content of composite membranes was calculated according to the following formula:

$$\text{Acid Content} = \frac{\left( \text{Thickness at } 0\ RH - \frac{M/A_{microporous\ layer}}{\text{Matrix Density}_{MPM}} \right) \times \text{Density}_{ionomer}}{EW_{ionomer}} \times$$

$$\frac{1}{\text{Composite Membrane thickness at 0\% } RH} = \left[ \frac{\text{mole eq}}{\text{cc}} \right]$$

Ball Burst Test of Composite Membrane

The mechanical strength of a composite membrane prepared in accordance with the present invention was measured by subjecting a sample to a load pressure.

A sample was fixed taut in a frame with a 45 mm diameter opening. The sample in the frame was placed into an universal testing machine AG-1 of Shimadzu Corporation, Japan with an environmentally controlled chamber with the temperature and relative humidity inside of the chamber being 23 (C and 80%, respectively. A steel ball with a diameter of 1 mm, supported on a post, was pressed into the suspended membrane at a constant rate of 100 mm/min. The maximum load generated by the system at the sample's break was recorded and that value is called the ball burst strength.

Membrane Electrode Assembly (MEA) of Composite Membrane

MEAs with an active area A of 1.27 cm² were prepared in order to measure the transport resistance of protons and hydrogen through the composite membrane samples of the present invention. For each MEA, the area of the composite membrane was oversized to provide a sealing surface. Furthermore, the anode and cathode were identical, and were prepared on a release layer by a proprietary ink-based process as used in the manufacture of the PRIMEA® MEMBRANE ELECTRODE ASSEMBLY Series 5580 (W.L. Gore & Associates, Inc.). Each electrode comprised a Pt/C catalyst, was coated and dried on a release layer, and had a platinum area loading of 0.4 mg/cm². The electrodes were dry-laminated to each side of the composite membrane using heat and pressure (160° C. and 100 psi for 3 minutes), and the release layer was removed.

H⁺ Resistance and H₂ Resistance of a Composite Membrane

As used herein, the term "proton resistance" (or H⁺ resistance) refers to the reciprocal of proton conductance, and the term "hydrogen resistance" (or H₂ resistance) refers to the reciprocal of hydrogen permeance. These properties were measured in a single, combined test protocol comprising a series of electrochemical measurements. These measurements are well-known to those of ordinary skill in the art, but the practical details of a combined protocol often differ between laboratories, so these practical details will be described here. An MEA was prepared as described above, then mounted and sealed in a fuel cell test fixture of proprietary design, along with proprietary carbon-based, hydrophobic gas diffusion layers (GDLs) on both the anode and cathode sides. The sample and GDLs were compressed between gold-plated flow fields with a mechanical pressure of 184 psi. The fixture was warmed to 80° C. and purged with H₂ on the anode side and air on the cathode side, then conditioned according to the teachings of U.S. patent application Ser. No. 11/043,917. After conditioning, the cathode side was purged with N₂, and the hydrogen resistance and proton resistance were measured at the following relative humidities (RHs): 10%, 20%, 40%, 50%, 60%, and 80%. At each RH, the sample was equilibrated for 25 minutes before making measurements. The hydrogen resistance was measured by applying a potentiostatic hold every 50 mV between 0.3 V and 0.6 V for one minute each, and averaging the current values during the last 10 seconds of the hold. The average value of current generated from hydrogen crossover $XO_{avg}$, between the anodic and cathodic sweeps was used. The current generated from hydrogen crossover $XO_{avg}$ is normalized to the active area and hydrogen partial pressure, pH2 in order to calculate hydrogen resistance:

$$R^{H_2} = \frac{A * p_{H_2}}{XO_{avg}} = \left[ \frac{MPa \times cm^2}{mA} \right]$$

Hydrogen permeance can then be calculated as:

$$p^{H_2} = \frac{1}{R^{H_2}} = \left[ \frac{mA}{MPa \times cm^2} \right]$$

The electrochemical impedance spectra were measured in the frequency ω from 20 kHz to 1 Hz. The high frequency proton resistance, $R^{H+}$, was calculated by normalizing to active area the measured total impedance, $Z_{TOTAL}$, fitted with a porous electrode equivalent circuit model accounting for electrode ionic resistance, $R_{EIR}$, a constant phase element described by non-ideal double layer capacitance, $Q_{DL}$, with non-ideality parameter, ϕ, electrical impedance contributed by the system, $Z_{SYSTEM}$, and electric impedance contributed by gas diffusion media $Z_{GDM}$.

$$R^{H+} = A * \left[ Z_{TOTAL} - \left( Z_{SYSTEM} + Z_{GDM} + \sqrt{\frac{R_{EIR}}{Q_{DL}(j \cdot 2\pi\omega)^\phi \cdot \tanh\left(\sqrt{R_{EIR} \cdot Q_{DL} \cdot (j \cdot 2\pi\omega)^\phi}\right)}} \right) \right] = [mOhm \times cm^2]$$

Proton conductance can then be calculated as:

$$K^{H+} = \frac{1}{R^{H+}} = [Siemens/cm^2]$$

Selectivity of a Composite Membrane

Selectivity of multilayer composite membrane was calculated according to the following equation:

$$\text{Selectivity} = \frac{R^{H_2}}{R^{H+}} = \frac{K^{H+}}{P^{H_2}} = \left[\frac{MPa}{mV}\right]$$

Selectivity parameter represents how much of a barrier membrane presents to two transport processes occurring in fuel cell, of hydrogen gas and protons. In order for fuel cell to utilize hydrogen gas with high efficiency it is desired for membrane to exhibit as high of resistance to hydrogen gas transport as possible. At the same time, in order for fuel cell to be able to deliver high power it is desired for fuel cell membrane to have as low of proton resistance as possible. Consequently, fuel cell membranes with high values of selectivity are desired as they utilize hydrogen fuel better while providing higher power output.

Void Fraction Measurement

Void fraction in the composite membranes prepared in accordance with present disclosure may be measured using combination of gas pycnometer and laboratory mass scale. Gas pycnometer may use helium or other gases with larger molecules, like nitrogen. Use of gas that is absorbed by material under test may be avoided in order to get accurate results. A sample of composite membrane may be placed into a chamber of known volume. Chamber with sample inside may be evacuated from any atmospheric gas and possible volatile components, like water, that may be present in the sample. To ensure that sample and chamber are free from gaseous or other volatile components sample may be equilibrated at pressure below 0.001 atm for 20 minutes. A known volume of inert gas is then admitted into the chamber which contains sample. Pressure that is developed in the samples chamber may then be recorded. Next, the gas from sample chamber may be released into an empty chamber of known volume, and pressure is recorded. Using the two pressure readings and the value of known chamber volumes, the volume of the sample that is inaccessible to gas molecules may be calculated.

b. Examples

The apparatus and method of production of the present disclosure may be better understood by referring to the following non-limiting examples.

To determine characteristics such as acid content, volume, selectivity, and strength of the composite membrane and properties of the test procedures and measurement protocols were performed as described above. The table shown in FIG. 6 illustrates properties of the microporous polymer structure used in various test procedures in 12 series of examples in accordance with some aspects of the invention. Each series contains one or more of comparative and/or inventive examples, as discussed in greater detail below. An individual table illustrating the properties of the composite membrane is provided in connection with each series.

Ion Exchange Materials Manufactured in Accordance with Aspects of the Present Disclosure for all Examples All ion exchange materials used in the following examples are perfluorosulfonic acid (PFSA) based ionomers with the specified equivalent volume (EV) in FIG. 6. All ionomers prior to manufacturing of composite membranes were in the form of solutions based on water and ethanol mixtures as solvent with water content in solvent phase being less than 50%.

A commonly known ion exchange materials was used to produce a composite membrane of the present disclosure. A preferable example is a solution obtained by dispersing or dissolving a solid PFSA ionomer represented by the following general formula (wherein a:b=1:1 to 9:1 and n=0, 1, or 2) in a solvent.

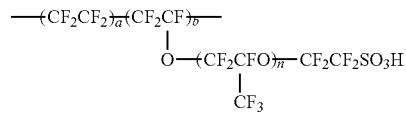

In some aspects, the solvent is selected from the group consisting of: water; alcohols such as methanol, ethanol, propanol, n-butylalcohol, isobutylalcohol, sec-butylalcohol, and tert-butylalcohol; hydrocarbon solvents such as n-hexane; ether-based solvents such as tetrahydrofuran and dioxane; sulfoxide-based solvents such as dimethylsulfoxide and diethylsulfoxide; formamide-based solvents such as N,N-dimethylformamide and N,N-diethylformamide; acetamide-based solvents such as N,N-dimethylacetamide and N,N-diethylacetamide; pyrrolidone-based solvents such as N-methyl-2-pyrrolidone and N-vinyl-2-pyrrolidone; 1,1,2,2-tetrachloroethane; 1,1,1,2-tetrachloroethane; 1,1,1-trichloroethane; 1,2-dichloroethane; trichloroethylene; tetrachloroethylene; dichloromethane; and chloroform. In the present disclosure, the solvent is optionally selected from the group consisting of water, methanol, ethanol, propanol. Water and the above solvents may be used alone or in combinations of two or more.

Series 1

Comparative Example 1.1

Comparative example 1.1 was made according to the following procedure. An ePTFE membrane 1 with mass per area of 0.6 g/m², a thickness of 3.6 μm, an apparent density of 0.17 g/cc and a bubble point of 75.0 psi was hand strained to eliminate wrinkles and restrained in this state by a metal frame. Next, a first laydown of PSFA solution with EV=347 cc/mole eq (obtained from Shanghai Gore 3F Fluoromaterials Co., LTD., China), solution composition of 39.6% water, 41.3% ethanol, 19.1% solids, was coated onto the top side of a polymer sheet substrate. The polymer sheet substrate (obtained from DAICEL VALUE COATING LTD., Japan) comprises PET and a protective layer of cyclic olefin copolymer (COC), and was oriented with the COC side on top. The IEM (PFSA solution) coating was accomplished using a meyer bar with nominal wet coating thickness of 2.6 mils. While the coating was still wet, the ePTFE membrane 1 previously restrained on metal frame was laminated to the coating, whereupon the IEM solution imbibed into the pores. This composite material was subsequently dried in a convection oven with air inside at a temperature of 165° C. Upon drying, the microporous polymer structure (ePTFE membrane) became fully imbibed with the IEM. The IEM also formed a layer between the bottom surface of the microporous polymer substrate and the polymer sheet substrate. On the second laydown, same solution of IEM was coated onto the top surface of the composite material (the surface opposite the polymer sheet substrate) using a drawdown bar with nominal wet coating thickness of 3 mil. The composite material was then dried again at 165° C., at which point it was largely transparent, indicating a full impregnation of the microporous polymer structure. The multilayer composite membrane was fully occlusive and had a layer of IEM on each side of the microporous polymer matrix. The resulting multilayer composite membrane had thickness at 0% RH of 9.9 micron, 2.7% by volume occupied by microporous polymer structure, and acid content of 2.8 meq/cc.

Results of proton to hydrogen gas transport selectivity measurements are listed in table 1.

Inventive Example 1.2

Inventive example 1.2 was prepared according to the same procedure as described above and the one used for comparative example 1.1 except that different materials were used. An ePTFE membrane 2 with mass per area of 3.1 g/m², a thickness of 9.4 µm, an apparent density of 0.33 g/cc and a bubble point of 56.8 psi was used as microporous polymer structure. A PSFA solution as IEM with EV=311 cc/mole eq. (obtained from Shanghai Gore 3F Fluoromaterials Co., LTD., China), solution composition of 21.2% water, 62.4% ethanol, 16.4% solids, was coated on first laydown using a drawdown bar with nominal wet coating thickness of 4 mil. On the second laydown, same solution of IEM was coated onto the top surface of the composite material (the surface opposite the polymer sheet substrate) using a drawdown bar with nominal wet coating thickness of 2 mil. The composite membrane was fully occlusive and had a layer of IEM on each side of the microporous polymer substrate. The resulting composite membrane had thickness at 0% RH of 9.8 micron, 14.0% by volume occupied by microporous polymer structure, and acid content of 2.8 meq/cc.

Results of proton to hydrogen gas transport selectivity measurements are listed in table 1.

Table 1 shows results of the various test procedures for the composite material of Comparative Example 1.1 and the Inventive Example 1.2.

TABLE 1

| | | Composite membrane | | | | |
|---|---|---|---|---|---|---|
| | | dry thickness (µm) | Microporous polymer structure Vol % | Total volume Vol % | Acid concentration (meq/cc) | Structure | Selectivity (MPa/mV) |
| 1.1 | comparative | 9.9 | 2.70% | 100 | 2.8 | fully imbibed with 2 BC | 1 |
| 1.2 | inventive | 9.8 | 14.00% | 100 | 2.8 | fully imbibed with 2 BC | 1.2 |

As shown in Table 1, the composite membrane of Example 1.1 and Example 1.2 have similar thickness (i.e., 9.9 and 9.8 microns, respectively) and same total acid content (i.e., 2.8 meq/cc). Therefore, the composite membranes of Example 1.1 and Example 1.2 have similar conductance characteristics as demonstrated by the resistivity measurements. It was surprisingly and unexpectedly discovered, however, that the variations in the final mass of the microporous polymer structure (e.g., the expanded porous polytetrafluoroethylene) and the ion exchange material (e.g., perfluoro sulfonic acid resin) created very different permeance characteristics in the composite membranes. For example, the composite membrane of Example 1.2 demonstrated improved or increased selectivity compared to that of the composite membrane of Example 1.1 (i.e., 1.2 MPA/mV for Example 1.2 compared to 1.0 MPA/mV for Example 1.1 at 50% RH). Surprisingly, combined data for selectivity of comparative example 1.1 and inventive example 1.2 demonstrate that selectivity increase as volume % occupied by microporous polymer structure increases while total acid content of the membranes was kept constant. The increase or the improvement in the selectivity is illustrated with line 302, shown in graph 300 of FIG. 3A and graph 350 of FIG. 3B.

Additionally, by increasing the final mass of the microporous polymer structure (e.g., the ePTFE) in Example 1.2 as compared to Example 1.1, it was possible to lower the final mass of the ion exchange material (e.g., perfluoro sulfonic acid resin) in Example 1.2 as compared to Example 1.1. This resulted in an increase in the overall volume of the microporous polymer structure from 2.7% in Example 1.1 to 14.0% in Example 1.2, which consequently improved reinforcement for the composite membrane and lowered the cost to manufacture the composite membrane (i.e., a decrease in the final mass of the costly ion exchange material that was used to manufacture the composite membrane).

Series 2

Comparative Example 2.1

Comparative example 2.1 was prepared according to the same procedure as the one used for comparative example 1.1 except that different materials were used. An ePTFE membrane 3 with mass per area of 1.2 g/m², a thickness of 5.4 µm, an apparent density of 0.23 g/cc and a bubble point of 38.0 psi was used as microporous polymer matrix. A solution of IEM with EV=347 cc/mole eq (obtained from Shanghai Gore 3F Fluoromaterials Co., LTD., China), solution composition of 39.6% water, 41.3% ethanol, 19.1% solids, was coated on first laydown using a meyer bar with nominal wet coating thickness of 2 mil. On the second laydown, same solution of IEM was coated onto the top surface of the composite material (the surface opposite the substrate) using a drawdown bar with nominal wet coating thickness of 1.5 mil. The multilayer composite membrane was fully occlusive and had a layer of IEM on each side of the microporous polymer matrix. The resulting multilayer composite membrane had thickness at 0% RH of 7.8 micron, 6.9% by volume occupied by microporous polymer structure, and acid content of 2.7 meq/cc.

Results of proton to hydrogen gas transport selectivity measurements are listed in table 2.

Inventive Example 2.2

Inventive example 2.2 was prepared according to the same procedure as the one used for comparative example 1.1 except that different materials were used. An ePTFE membrane 4 with mass per area of 2.8 g/m$^2$, a thickness of 9.6 μm, an apparent density of 0.29 g/cc and a bubble point of 34.4 psi was used as microporous polymer matrix. A solution of IEM with EV=311 cc/mole eq (obtained from Shanghai Gore 3F Fluoromaterials Co., LTD., China), solution composition of 21.2% water, 62.4% ethanol, 16.4% solids, was coated on first laydown using a drawdown bar with nominal wet coating thickness of 3 mil. On the second laydown, same solution of IEM was coated onto the top surface of the composite material (the surface opposite the substrate) using a drawdown bar with nominal wet coating thickness of 1 mil. The multilayer composite membrane was fully occlusive and had a layer of IEM on each side of the microporous polymer matrix. The resulting multilayer composite membrane had thickness at 0% RH of 8.0 micron, 15.5% by volume occupied by microporous polymer structure, and acid content of 2.7 meq/cc.

Results of proton to hydrogen gas transport selectivity measurements are listed in table 2. Surprisingly, again combined data for selectivity of comparative examples 1.1, 2.1 and inventive examples 1.2, 2.2 demonstrate that selectivity increase as volume % occupied by microporous polymer structure increases regardless of microporous polymer structure being used while total acid content of the membranes was kept constant.

Table 2 shows results of the various test procedures for the composite material of Comparative Example 2.1 and the Inventive Example 2.2.

TABLE 2

| | | Composite membrane | | | | |
|---|---|---|---|---|---|---|
| | | dry thickness (μm) | Microporous polymer structure Vol % | Total volume Vol % | Acid concentration (meq/cc) | Structure | Selectivity (MPa/mV) |
| 2.1 | comparative | 7.8 | 6.90% | 100 | 2.7 | fully imbibed with 2 BC | 0.8 |
| 2.2 | Inventive | 8 | 15.50% | 100 | 2.7 | fully imbibed with 2 BC | 0.9 |

As shown in Table 2, the composite membranes of Example 2.1 and Example 2.2 have similar thickness (i.e., 7.8 and 8 microns, respectively) and same total acid content (i.e., 2.7 meq/cc). Therefore, the composite membranes of Example 2.1 and Example 2.2 have similar conductance characteristics as demonstrated by the resistivity measurements. It was surprisingly and unexpectedly discovered, however, that the variations in the final mass of the microporous polymer structure (e.g., the expanded porous polytetrafluoroethylene) and the ion exchange material (e.g., perfluoro sulfonic acid resin) created very different permeance characteristics in the composite membranes. For example, the composite membrane of Example 2.2 demonstrated improved or increased selectivity compared to that of the composite membrane of Example 2.1 (i.e., 1.9 MPA/mV for Example 2.2 compared to 0.8 MPA/mV for Example 2.1 at 50% RH). The increase or the improvement in the selectivity is illustrated with line 304, shown in graph 300 of FIG. 3A and graph 350 of FIG. 3B.

Additionally, by increasing the final mass of the microporous polymer structure (e.g., the ePTFE) in Example 2.2 as compared to Example 2.1, it was possible to lower the final mass of the composite membrane (e.g., perfluoro sulfonic acid resin) in Example 2.2 as compared to Example 2.1. This resulted in an increase in the overall volume of the microporous polymer structure from 6.9% in Example 2.1 to 15.5% in Example 2.2, which consequently improved reinforcement for the composite membrane and a lowed the cost to manufacture the composite membrane (i.e., a decrease in the final mass of the costly ion exchange material that was used to manufacture the composite membrane).

Series 3

Comparative Example 3.1

Comparative example 3.1 was prepared according to the same procedure as the one used for comparative example 1.1 except that different materials were used. An ePTFE membrane 1 with mass per area of 0.6 g/m$^2$, a thickness of 3.6 μm, an apparent density of 0.17 g/cc and a bubble point of 75.0 psi was used as microporous polymer matrix. A solution of IEM with EV=458 cc/mole eq (obtained from Shanghai Gore 3F Fluoromaterials Co., LTD., China), solution composition of 15.3% water, 61.7% ethanol, 23% solids, was coated on first laydown using a meyer bar with nominal wet coating thickness of 3 mil. On the second laydown, same solution of IEM was coated onto the top surface of the composite material (the surface opposite the substrate) using a drawdown bar with nominal wet coating thickness of 4 mil. The multilayer composite membrane was fully occlusive and had a layer of IEM on each side of the microporous polymer matrix. The resulting multilayer composite membrane had thickness at 0% RH of 14.4 micron, 1.8% by volume occupied by microporous polymer structure, and acid content of 2.1 meq/cc.

Results of proton to hydrogen gas transport selectivity measurements are listed in table 3.

Inventive Example 3.2

Inventive example 3.2 was prepared according to the same procedure as the one used for comparative example 1.1 except that different materials were used. An ePTFE membrane 4 with mass per area of 8.9 g/m$^2$, a thickness of 25.1 μm, an apparent density of 0.36 g/cc and a bubble point of 42.7 psi was used as microporous polymer matrix. A solution of IEM with EV=329 cc/mole eq (obtained from Shanghai Gore 3F Fluoromaterials Co., LTD., China), solution composition of 22.0% water, 63.8% ethanol, 14.2% solids, was coated on first laydown using a meyer bar with nominal wet coating thickness of 5.8 mil. On the second laydown, same solution of IEM was coated onto the top surface of the composite material (the surface opposite the substrate) using a drawdown bar with nominal wet coating thickness of 1 mil. The multilayer composite membrane was fully occlusive and had a layer of IEM on each side of the microporous polymer matrix. The resulting multilayer composite membrane had thickness at 0% RH of 14.5 micron, 27.3% by volume occupied by microporous polymer structure, and acid content of 2.2 meq/cc.

Table 3 shows results of the various test procedures for the composite material of Comparative Example 3.1 and the Inventive Example 3.2.

TABLE 3

| | | Composite membrane | | | | |
|---|---|---|---|---|---|---|
| | | dry thickness (μm) | Microporous polymer structure Vol % | Total volume Vol % | Acid concentration (meq/cc) | Structure | Selectivity (MPa/mV) |
| 3.1 | comparative | 14.4 | 1.80% | 100 | 2.1 | fully imbibed with 2 BC | 0.6 |
| 3.2 | inventive | 14.5 | 27.30% | 100 | 2.2 | fully imbibed with 2 BC | 0.9 |

As shown in Table 3, the composite membranes of Example 3.1 and Example 3.2 have similar thickness (i.e., 14.4 and 14.5 microns, respectively) and similar total acid content (i.e., 2.1 and 2.2 meq/cc, respectively). Therefore, the composite membranes of Example 3.1 and Example 3.2 have similar conductance characteristics as demonstrated by the resistivity measurements. It was surprisingly and unexpectedly discovered, however, that the variations in the final mass of the microporous polymer structure (e.g., the expanded porous polytetrafluoroethylene) and the ion exchange material (e.g., perfluoro sulfonic acid resin) created very different permeance characteristics in the composite membranes. For example, the composite membrane of Example 3.2 demonstrated improved or increased selectivity compared to that of the composite membrane of Example 3.1 (i.e., 0.9 MPA/mV for Example 3.2 compared to 0.6 MPA/mV for Example 3.1 at 50% RH). Results of proton to hydrogen gas transport selectivity measurements are listed in table 3. Surprisingly, combined data for selectivity of comparative example 3.1 and inventive example 3.2 demonstrate that selectivity increase as volume % occupied by microporous polymer structure increases even when membranes are thick and microporous polymer structure volume fraction reaches high levels of near 30%. The increase or the improvement in the selectivity is illustrated with line 306, shown in graph 300 of FIG. 3A and graph 350 of FIG. 3B.

Additionally, by increasing the final mass of the microporous polymer structure (e.g., the ePTFE) in Example 3.2 as compared to Example 3.1, it was possible to lower the final mass of the ion exchange material (e.g., perfluoro sulfonic acid resin) in Example 3.2 as compared to Example 3.1. This resulted in an increase in the overall volume of the microporous polymer structure from 1.8% in Example 3.1 to 27.3% in Example 3.2, which consequently improved reinforcement for the composite membrane (i.e., a ball burst strength of 3.2 N in Example 3.2 as compared to 1.8 N in Example 3.1) and a lowed the cost to manufacture the composite membrane (i.e., a decrease in the final mass of the costly ion exchange material that was used to manufacture the composite membrane).

Series 4

Comparative Example 4.1

Comparative example 4.1 was prepared according to the same procedure as the one used for comparative example 1.1 except that different materials were used. An ePTFE membrane 1 with mass per area of 0.6 g/m$^2$, a thickness of 3.6 μm, an apparent density of 0.17 g/cc and a bubble point of 75.0 psi was used as microporous polymer structure. A solution of IEM with EV=458 cc/mole eq (obtained from Shanghai Gore 3F Fluoromaterials Co., LTD., China), solution composition of 30.0% water, 60.8% ethanol, 9.2% solids, was coated on first laydown using a drawdown bar with nominal wet coating thickness of 4 mil. On the second laydown, a solution of IEM with EV=458 cc/mole eq (obtained from Shanghai Gore 3F Fluoromaterials Co., LTD., China), solution composition of 13% water, 74.7% ethanol, 12.3% solids, was coated onto the top surface of the composite material (the surface opposite the substrate) using a drawdown bar with nominal wet coating thickness of 2 mil. The multilayer composite membrane was fully occlusive and had a layer of IEM on each side of the microporous polymer matrix. The resulting multilayer composite membrane had thickness at 0% RH of 5.5 micron, 4.9% by volume occupied by microporous polymer structure, and acid content of 2.1 meq/cc.

Results of proton to hydrogen gas transport selectivity measurements are listed in table 4.

Inventive Example 4.2

Inventive example 4.2 was prepared according to the same procedure as the one used for comparative example 1.1 except that different materials were used. An ePTFE membrane 6 with mass per area of 1.9 g/m$^2$, a thickness of 7.2 μm, an apparent density of 0.27 g/cc and a bubble point of 137.6 psi was used as microporous polymer structure. A solution of IEM with EV=413 cc/mole eq (obtained from Shanghai Gore 3F Fluoromaterials Co., LTD., China), solution composition of 17.3% water, 71.5% ethanol, 11.2% solids, was coated on first laydown using a drawdown bar with nominal wet coating thickness of 4 mil. On the second laydown, same solution of IEM was coated onto the top surface of the composite material (the surface opposite the substrate) using a drawdown bar with nominal wet coating thickness of 2 mil. The multilayer composite membrane was fully occlusive and had a layer of IEM on each side of the microporous polymer matrix. The resulting multilayer composite membrane had thickness at 0% RH of 6.4 micron, 13.2% by volume occupied by microporous polymer structure, and acid content of 2.1 meq/cc.

Results of proton to hydrogen gas transport selectivity measurements are listed in table 4.

Inventive Example 4.3

Inventive example 4.3 was prepared according to the same procedure as the one used for comparative example 1.1 except that different materials were used. An ePTFE membrane 7 with mass per area of 4.8 g/m$^2$, a thickness of 14.8 μm, an apparent density of 0.33 g/cc and a bubble point of 68.4 psi was used as microporous polymer structure. A solution of IEM with EV=311 cc/mole eq (obtained from Shanghai Gore 3F Fluoromaterials Co., LTD., China), solution composition of 21.2% water, 62.9% ethanol, 16.4% solids, was coated on first laydown using a drawdown bar with nominal wet coating thickness of 3 mil. On the second laydown, a solution of IEM with EV=311 cc/mole eq (obtained from Shanghai Gore 3F Fluoromaterials Co., LTD., China), solution composition of 5.1% water, 94.4% ethanol, 0.5% solids, was coated onto the top surface of the composite material (the surface opposite the substrate) using a drawdown bar with nominal wet coating thickness of 0.5 mil. The multilayer composite membrane was fully occlusive and had a layer of IEM on each side of the microporous polymer matrix. The resulting multilayer composite membrane had thickness at 0% RH of 6.4 micron, 33.3% by volume occupied by microporous polymer structure, and acid content of 2.1 meq/cc.

Results of proton to hydrogen gas transport selectivity measurements are listed in table 4. Data for selectivity of comparative example 4.1 and inventive examples 4.2 and 4.3 demonstrate that selectivity increase as volume % occupied by microporous polymer structure increases even when membranes are thick and microporous polymer structure volume fraction exceeds 30%.

Table 4 shows results of the various test procedures for the composite material of Comparative Example 4.1 and the Inventive Examples 4.2 and 4.3.

TABLE 4

| | | | Composite membrane | | | |
|---|---|---|---|---|---|---|
| | | dry thickness (μm) | Microporous polymer structure Vol % | Total volume Vol % | Acid concentration (meq/cc) | Structure | Selectivity (MPa/mV) |
| 4.1 | comparative | 5.5 | 4.90% | 100 | 2.1 | fully imbibed with 2 BC | 0.5 |
| 4.2 | Inventive | 6.4 | 13.20% | 100 | 2.1 | fully imbibed with 2 BC | 0.6 |
| 4.3 | inventive | 6.4 | 33.30% | 100 | 2.1 | fully imbibed with 2 BC | 0.9 |

As shown in Table 4, the composite membranes of Example 4.1, Examples 4.2 and 4.3 have comparable thickness (i.e., 5.5, 6.4 and 6.4 microns, respectively) and same total acid content (i.e., 2.1 meq/cc). Therefore, the composite membranes of Example 4.1, Examples 4.2 and 4.3 have similar conductance characteristics as demonstrated by the resistivity measurements. It was surprisingly and unexpectedly discovered, however, that the variations in the final mass of the microporous polymer structure (e.g., the expanded porous polytetrafluoroethylene) and the ion exchange material (e.g., perfluoro sulfonic acid resin) created very different permeance characteristics in the composite membranes. For example, the composite membranes of Examples 4.2 and 4.3 demonstrated improved or increased selectivity compared to that of the composite membrane of Example 4.1 (i.e., 0.6 MPA/mV for Example 4.2 and 0.9 MPA/mV for Example 4.3 compared to 0.5 MPA/mV for Example 4.1 at 50% RH). Combined data from examples series 1-4 indicate that addition of more of inert microporous polymer structure, in this case ePTFE, while total acid content of the membranes was kept constant leads to improved fuel cell performance of multilayer composite membranes used in fuel cell application regardless of thickness of multilayer composite membranes or type of microporous polymer structure used or what IEM is used. This is a surprising and unexpected finding. The increase or the improvement in the selectivity is illustrated with line 308, shown in graph 300 of FIG. 3A and graph 350 of FIG. 3B.

Additionally, by increasing the final mass of the microporous polymer structure (e.g., the ePTFE) in Examples 4.2 and 4.3 as compared to Example 4.1, it was possible to lower the final mass of the ion exchange material (e.g., perfluoro sulfonic acid resin) in Examples 4.2 and 4.3 as compared to Example 4.1. This resulted in an increase in the overall volume of the microporous polymer structure from 4.9% in Example 4.1 to 13.2% in Example 4.2 and 33.3% in Example 4.3, which consequently improved reinforcement for the composite membrane (and a lowed the cost to manufacture the composite membrane (i.e., a decrease in the final mass of the costly ion exchange material that was used to manufacture the composite membrane).

Series 5

Comparative Example 5.1

Comparative example 5.1 was prepared according to the same procedure as the one used for comparative example 1.1 except that different materials were used. An ePTFE membrane 1 with mass per area of 0.6 g/m$^2$, a thickness of 3.6 μm, an apparent density of 0.17 g/cc and a bubble point of 75.0 psi was used as microporous polymer matrix. A solution of IEM with EV=509 cc/mole eq (D2020 (obtained from Ion Power Inc., USA), solution composition of 22.1% water, 62.9% ethanol, 15.0% solids, was coated on first laydown using a meyer bar with nominal wet coating thickness of 2.6 mil. On the second laydown, same solution of IEM was coated onto the top surface of the composite material (the surface opposite the substrate) using a drawdown bar with nominal wet coating thickness of 3 mil. The multilayer composite membrane was fully occlusive and had a layer of IEM on each side of the microporous polymer matrix. The resulting multilayer composite membrane had thickness at 0% RH of 7.9 micron, 3.4% by volume occupied by microporous polymer structure, and acid content of 1.9 meq/cc.

Results of proton to hydrogen gas transport selectivity measurements are listed in table 5.

Inventive Example 5.2

Inventive example 5.2 was prepared according to the same procedure as the one used for comparative example 1.1 except that different materials were used. An ePTFE membrane 8 with mass per area of 2.2 g/m$^2$ was used as microporous polymer matrix. A solution of IEM with EV=458 cc/mole eq (obtained from Shanghai Gore 3F Fluoromaterials Co., LTD., China), solution composition of 20.2% water, 60.0% ethanol, 19.8% solids, was coated on first laydown using a meyer bar with nominal wet coating thickness of 2 mil. Second laydown of the same IEM solution was coated onto the top surface of the composite material (the surface opposite the substrate) using a drawdown bar with nominal wet coating thickness of 1.5 mil. The multilayer composite membrane was fully occlusive and had a layer of IEM on each side of the microporous polymer matrix. The resulting multilayer composite membrane had thickness at 0% RH of 7.8 micron, 12.5% by volume occupied by microporous polymer structure, and acid content of 1.9 meq/cc.

Results of proton to hydrogen gas transport selectivity measurements are listed in table 5.

Table 5 shows results of the various test procedures for the composite material of Comparative Example 5.1 and the Inventive Example 5.2.

TABLE 5

|  |  | dry thickness (μm) | Microporous polymer structure Vol % | Total volume Vol % | Acid concentration (meq/cc) | Structure | Selectivity (MPa/mV) |
|---|---|---|---|---|---|---|---|
| 5.1 | Comparative | 7.9 | 3.40% | 100 | 1.9 | fully imbibed with 2 BC | 0.4 |
| 5.2 | Inventive | 7.8 | 12.50% | 100 | 1.9 | fully imbibed with 2 BC | 0.5 |

As shown in Table 5, the composite membranes of Example 5.1 and Example 5.2 have similar thickness (i.e., 7.9 and 7.8 microns, respectively) and same total acid content (i.e., 1.9 meq/cc). Therefore, the composite membranes of Example 5.1 and Example 5.2 have similar conductance characteristics as demonstrated by the resistivity measurements. It was surprisingly and unexpectedly discovered, however, that the variations in the final mass of the microporous polymer structure (e.g., the expanded porous polytetrafluoroethylene) and the ion exchange material (e.g., perfluoro sulfonic acid resin) created very different permeance characteristics in the composite membranes. For example, the composite membrane of Example 5.2 demonstrated improved or increased selectivity compared to that of the composite membrane of Example 5.1 (i.e., 0.5 MPA/mV for Example 5.2 compared to 0.4 MPA/mV for Example 5.1 at 50% RH). The increase or the improvement in the selectivity is illustrated with line 310, shown in graph 300 of FIG. 3A and graph 350 of FIG. 3B.

Additionally, by increasing the final mass of the microporous polymer structure (e.g., the ePTFE) in Example 5.2 as compared to Example 5.1, it was possible to lower the final mass of the ion exchange material (e.g., perfluoro sulfonic acid resin) in Example 5.2 as compared to Example 5.1. This resulted in an increase in the overall volume of the microporous polymer structure from 3.4% in Example 5.1 to 12.5% in Example 5.2, which consequently improved reinforcement for the composite membrane and a lowed the cost to manufacture the composite membrane (i.e., a decrease in the final mass of the costly ion exchange material that was used to manufacture the composite membrane).
Series 6

Comparative Example 6.1

Comparative example 6.1 was prepared according to the same procedure as the one used for comparative example 1.1 except that different materials were used. An ePTFE membrane 6 with mass per area of 1.9 g/m², a thickness of 7.2 μm, an apparent density of 0.27 g/cc and a bubble point of 137.6 psi was used as microporous polymer matrix. A solution of IEM with EV=458 cc/mole eq (obtained from Shanghai Gore 3F Fluoromaterials Co., LTD., China), solution composition of 30.0% water, 60.8% ethanol, 9.2% solids, was coated on first laydown using a drawdown bar with nominal wet coating thickness of 5 mil. On the second laydown, same solution of IEM was coated onto the top surface of the composite material (the surface opposite the substrate) using a drawdown bar with nominal wet coating thickness of 2 mil. The multilayer composite membrane was fully occlusive and had a layer of IEM on each side of the microporous polymer matrix. The resulting multilayer composite membrane had thickness at 0% RH of 6.4 micron, 13.1% by volume occupied by microporous polymer structure, and acid content of 1.9 meq/cc.

Results of proton to hydrogen gas transport selectivity measurements are listed in table 6.

Inventive Example 6.2

Inventive example 6.2 was prepared according to the same procedure as the one used for comparative example 1.1 except that different materials were used. An ePTFE membrane 9 with mass per area of 5.8 g/m², a thickness of 12.5 μm, an apparent density of 0.46 g/cc and a bubble point of 32.2 psi was used as microporous polymer matrix. A solution of IEM with EV=311 cc/mole eq (obtained from Shanghai Gore 3F Fluoromaterials Co., LTD., China), solution composition of 21.2% water, 62.4% ethanol, 16.4% solids, was coated on first laydown using a meyer bar with nominal wet coating thickness of 2 mil. On the second laydown, a solution of IEM with EV=311 cc/mole eq (obtained from Shanghai Gore 3F Fluoromaterials Co., LTD., China), solution composition of 5.1% water, 94.4% ethanol, 0.5% solids, was coated onto the top surface of the composite material (the surface opposite the substrate) using a drawdown bar with nominal wet coating thickness of 1 mil. The multilayer composite membrane was fully occlusive and had a layer of IEM on each side of the microporous polymer matrix. The resulting multilayer composite membrane had thickness at 0% RH of 6.2 micron, 41.8% by volume occupied by microporous polymer structure, and acid content of 1.9 meq/cc.

Results of proton to hydrogen gas transport selectivity measurements are listed in table 6.

Table 6 shows results of the various test procedures for the composite material of the Inventive Examples 6.1 and 6.2.

TABLE 6

| | | Composite membrane | | | | | |
|---|---|---|---|---|---|---|---|
| | | dry thickness (μm) | Microporous polymer structure Vol % | Total volume Vol % | Acid concentration (meq/cc) | Structure | Selectivity (MPa/mV) |
| 6.1 | Inventive | 6.4 | 13.10% | 100 | 1.9 | fully imbibed with 2 BC | 0.5 |
| 6.2 | inventive | 6.2 | 41.80% | 100 | 1.9 | fully imbibed with 2 BC | 0.7 |

As shown in Table 6, the composite membranes of Example 6.1 and Example 6.2 have similar thickness (i.e., 6.4 and 6.2 microns, respectively) and same total acid content (i.e., 1.9 meq/cc). Therefore, the composite membranes of Example 6.1 and Example 6.2 have similar conductance characteristics as demonstrated by the resistivity measurements. It was surprisingly and unexpectedly discovered, however, that the variations in the final mass of the microporous polymer structure (e.g., the expanded porous polytetrafluoroethylene) and the ion exchange material (e.g., perfluoro sulfonic acid resin) created very different permeance characteristics in the composite membranes. For example, the composite membrane of Example 6.2 demonstrated improved or increased selectivity compared to that of the composite membrane of Example 6.1 (i.e., 0.7 MPA/mV for Example 6.2 compared to 0.5 MPA/mV for Example 6.1 at 50% RH). Data for selectivity of comparative example 6.1 comparative example 5.1 and inventive example 6.2 and inventive example 5.2 demonstrate that selectivity increase as volume % occupied by microporous polymer structure increases even when membranes are made thinner and microporous polymer structure volume fraction exceeds 40%. The increase or the improvement in the selectivity is illustrated with line 312, shown in graph 300 of FIG. 3A and graph 350 of FIG. 3B.

Additionally, by increasing the final mass of the microporous polymer structure (e.g., the ePTFE) in Example 6.2 as compared to Example 6.1, it was possible to lower the final mass of the ion exchange material (e.g., perfluoro sulfonic acid resin) in Example 6.2 as compared to Example 6.1. This resulted in an increase in the overall volume of the microporous polymer structure from 13.1% in Example 6.1 to 41.8% in Example 6.2, which consequently improved reinforcement for the composite membrane and a lowed the cost to manufacture the composite membrane (i.e., a decrease in the final mass of the costly ion exchange material that was used to manufacture the composite membrane).

Series 7

Comparative Example 7.1

Comparative example 7.1 was prepared according to the same procedure as the one used for comparative example 1.1 except that different materials were used. An ePTFE membrane 10 with mass per area of 3.0 g/m$^2$, a thickness of 15.2 μm, an apparent density of 0.20 g/cc and a bubble point of 36.6 psi was used as microporous polymer matrix. A solution of IEM with EV=560 cc/mole eq (D2021 obtained from Ion Power Inc., USA), solution composition of 26.2% water, 57.3% ethanol, 16.5% solids, was coated on first laydown using a drawdown bar with nominal wet coating thickness of 3 mil. On the second laydown, a same solution of IEM was coated onto the top surface of the composite material (the surface opposite the substrate) using a drawdown bar with nominal wet coating thickness of 1 mil. The multilayer composite membrane was fully occlusive and had a layer of IEM on each side of the microporous polymer matrix. The resulting multilayer composite membrane had thickness at 0% RH of 7.1 micron, 18.8% by volume occupied by microporous polymer structure, and acid content of 1.4 meq/cc.

Results of proton to hydrogen gas transport selectivity measurements are listed in table 7.

Inventive Example 7.2

Inventive example 7.2 was prepared according to the same procedure as the one used for comparative example 1.1 except that different materials were used. An ePTFE membrane 9 with mass per area of 5.8 g/m$^2$, a thickness of 12.5 μm, an apparent density of 0.46 g/cc and a bubble point of 32.2 psi was used as microporous polymer matrix. A solution of IEM with EV=458 cc/mole eq (obtained from Shanghai Gore 3F Fluoromaterials Co., LTD., China), solution composition of 13% water, 74.7% ethanol, 12.3% solids, was coated on first laydown using a drawdown bar with nominal wet coating thickness of 5 mil. On the second laydown, a solution of IEM with EV=458 cc/mole eq (obtained from Shanghai Gore 3F Fluoromaterials Co., LTD., China), solution composition of 5.5% water, 94.0% ethanol, 0.5% solids, was coated onto the top surface of the composite material (the surface opposite the substrate) using a drawdown bar with nominal wet coating thickness of 1 mil. The multilayer composite membrane was fully occlusive and had a layer of IEM on each side of the microporous polymer matrix. The resulting multilayer composite membrane had thickness at 0% RH of 7.1 micron, 36.3% by volume occupied by microporous polymer structure, and acid content of 1.4 meq/cc.

Results of proton to hydrogen gas transport selectivity measurements are listed in table 7.

Inventive Example 7.3

Inventive example 7.3 was prepared according to the following procedure: First, two microporous polymer structures, ePTFE membrane 2 with mass per area of 3.1 g/m$^2$, a thickness of 9.4 μm, an apparent density of 0.33 g/cc and a bubble point of 56.8 psi and ePTFE membrane 10 with mass per area of 3.0 g/m$^2$, a thickness of 15.2, an apparent density of 0.20 g/cc and a bubble point of 36.6 psi were strained to eliminate wrinkles and restrained one on top of another touching on a metal frame. Next, a first laydown of solution of IEM with EV=413 cc/mole eq (obtained from Shanghai Gore 3F Fluoromaterials Co., LTD., China), solution composition of 17.3% water, 71.5% ethanol, 11.2% solids, was coated onto the top side of a polymer sheet substrate. The substrate (obtained from DAICEL VALUE COATING LTD., Japan) comprised PET and a protective layer of cyclic olephin copolymer (COC), and was oriented with the COC side on top. The coating was accomplished using a drawdown bar with nominal wet coating thickness of 5 mils. While the coating was still wet, the ePTFE membranes 2 and 10 previously restrained on metal frame were laminated to the coating, whereupon the IEM solution imbibed into the pores. This multilayer composite material was subsequently dried in a convection oven with air inside at a temperature of 165° C. Upon drying, the microporous polymer matrices became fully imbibed with the IEM. The IEM also formed a layer between the bottom surface of the microporous polymer matrix and the substrate. On the second laydown, a solution of IEM with EV=413 cc/mole eq (obtained from Shanghai Gore 3F Fluoromaterials Co., LTD., China), solution composition of 4% water, 95.0% ethanol, 1% solids, was coated onto the top surface of the composite material (the surface opposite the substrate) using a drawdown bar with nominal wet coating thickness of 0.5 mil. The multilayer composite material was then dried again at 165° C., at which point it was largely transparent, indicating a full impregnation of the microporous polymer matrix. The multilayer composite material was comprised of a multilayer composite membrane bonded to a substrate. The multilayer composite membrane was fully occlusive and had a layer of IEM on each side of the microporous polymer matrices that were touching. The resulting multilayer composite membrane had thickness at 0% RH of 6.9 micron, 39.4% by volume occupied by microporous polymer structure, and acid content of 1.5 meq/cc.

Results of proton to hydrogen gas transport selectivity measurements are listed in table 7. Table 7 shows results of the various test procedures for the composite material of Comparative Example 7.1 and the Inventive Examples 7.2 and 7.3.

TABLE 7

| | | Composite membrane | | | | |
|---|---|---|---|---|---|---|
| | | dry thickness (μm) | Microporous polymer structure Vol % | Total volume Vol % | Acid concentration (meq/cc) | Structure | Selectivity (MPa/mV) |
| 7.1 | comparative | 7.1 | 18.80% | 100 | 1.4 | fully imbibed with 2 BC | 0.3 |
| 7.2 | Inventive | 7.1 | 36.30% | 100 | 1.4 | fully imbibed with 2 BC | 0.4 |
| 7.3 | inventive | 6.9 | 39.40% | 100 | 1.5 | fully imbibed with 2 BC and 2 ePTFE layers | 0.5 |

As shown in Table 7, the composite membranes of Example 7.1 and Examples 7.2 and 7.3 have comparable thickness (i.e., 7.1, 7.1 and 6.9 microns, respectively) and similar total acid content (i.e., 1.4, 1.4, and 1.5 meq/cc, respectively). Therefore, the composite membranes of Example 7.1 and Examples 7.2 and 7.3 have similar conductance characteristics as demonstrated by the resistivity measurements. It was surprisingly and unexpectedly discovered, however, that the variations in the final mass of the microporous polymer structure (e.g., the expanded porous polytetrafluoroethylene) and the ion exchange material (e.g., perfluoro sulfonic acid resin) created very different permeance characteristics in the composite membranes. For example, the composite membranes of Examples 7.2 and 7.3 demonstrated improved or increased selectivity compared to that of the composite membrane of Example 7.1 (i.e., 0.4 MPA/mV for Example 7.2 and 0.5 MPA/mV for Example 7.3 compared to 0.3 MPA/mV for Example 7.1 at 50% RH). Data for selectivity of comparative example 7.1 and inventive examples 7.2 and 7.3 demonstrate that selectivity increase as volume % occupied by microporous polymer structure increases even when more than one microporous polymer matrices are present in the composite membrane. This is a surprising and unexpected finding. The increase or the improvement in the selectivity is illustrated with line 314, shown in graph 300 of FIG. 3A and graph 350 of FIG. 3B.

Additionally, by increasing the final mass of the microporous polymer structure (e.g., the ePTFE) in Examples 7.2 and 7.3 as compared to Example 7.1, it was possible to lower the final mass of the ion exchange material (e.g., perfluoro sulfonic acid resin) in Examples 7.2 and 7.3 as compared to Example 7.1. This resulted in an increase in the overall volume of the microporous polymer structure from 18.8% in Example 7.1 to 36.30% in Example 7.2 and 39.40% in Example 7.3, which consequently improved reinforcement for the composite membrane and a lowed the cost to manufacture the composite membrane (i.e., a decrease in the final mass of the costly ion exchange material that was used to manufacture the composite membrane).

Series 8

Comparative Example 8.1

Comparative example 8.1 was prepared according to the same procedure as the one used for comparative example 1.1 except that different materials were used. An ePTFE membrane 10 with mass per area of 3.0 g/m², a thickness of 15.2 μm, an apparent density of 0.20 g/cc and a bubble point of 36.6 psi was used as microporous polymer matrix. A solution of IEM with EV=560 cc/mole eq (D2021 obtained from Ion Power Inc., USA), solution composition of 25.0% water, 62.5% ethanol, 12.5% solids, was coated on first laydown using a meyer bar with nominal wet coating thickness of 2 mil. On the second laydown, a same solution of IEM was coated onto the top surface of the composite material (the surface opposite the substrate) using a drawdown bar with nominal wet coating thickness of 0.5 mil. The multilayer composite membrane was fully occlusive and had a layer of IEM on each side of the microporous polymer matrix. The resulting multilayer composite membrane had thickness at 0% RH of 4.9 micron, 27.1% by volume occupied by microporous polymer structure, and acid content of 1.3 meq/cc.

Results of proton to hydrogen gas transport selectivity measurements are listed in table 8.

Inventive Example 8.2

Inventive example 8.2 was prepared according to the same procedure as the one used for comparative example 1.1 except that different materials were used. An ePTFE membrane 7 with mass per area of 4.7 g/m², a thickness of 14.0 μm, an apparent density of 0.34 g/cc and a bubble point of 47.1 psi was used as microporous polymer matrix. A solution of IEM with EV=458 cc/mole eq (obtained from Shanghai Gore 3F Fluoromaterials Co., LTD., China), solution composition of 13% water, 74.7% ethanol, 12.3% solids, was coated on first laydown using a drawdown bar with nominal wet coating thickness of 3 mil. On the second laydown, a solution of IEM with EV=458 cc/mole eq (obtained from Shanghai Gore 3F Fluoromaterials Co., LTD., China), solution composition of 5.5% water, 94.0% ethanol, 0.5% solids, was coated onto the top surface of the composite material (the surface opposite the substrate) using a drawdown bar with nominal wet coating thickness of 1 mil. The multilayer composite membrane was fully occlusive and had a layer of IEM on each side of the microporous polymer matrix. The resulting multilayer composite membrane had thickness at 0% RH of 4.9 micron, 42.6% by volume occupied by microporous polymer structure, and acid content of 1.2 meq/cc.

Results of proton to hydrogen gas transport selectivity measurements are listed in table 8.

Table 8 shows results of the various test procedures for the composite material of comparative Example 8.1 and the Inventive Example 8.2.

TABLE 8

| | | Composite membrane | | | | |
|---|---|---|---|---|---|---|
| | | dry thickness (μm) | Microporous polymer structure Vol % | Total volume Vol % | Acid concentration (meq/cc) | Structure | Selectivity (MPa/mV) |
| 8.1 | Comparative | 4.9 | 27.10% | 100 | 1.3 | fully imbibed with 2 BC | 0.3 |
| 8.2 | inventive | 4.9 | 42.60% | 100 | 1.2 | fully imbibed with 2 BC | 0.4 |

As shown in Table 8, the composite membranes of Example 8.1 and Example 8.2 have the same thickness (i.e., 4.9 microns) and similar total acid content (i.e., 1.3 and 1.2 meq/cc, respectively). Therefore, the composite membranes of Example 8.1 and Example 8.2 have similar conductance characteristics as demonstrated by the resistivity measurements. It was surprisingly and unexpectedly discovered, however, that the variations in the final mass of the microporous polymer structure (e.g., the expanded porous polytetrafluoroethylene) and the ion exchange material (e.g., perfluoro sulfonic acid resin) created very different permeance characteristics in the composite membranes. For example, the composite membrane of Example 8.2 demonstrated improved or increased selectivity compared to that of the composite membrane of Example 8.1 (i.e., 0.4 MPA/mV for Example 8.2 compared to 0.3 MPA/mV for Example 8.1 at 50% RH). Combined data from examples series 1-8 indicate that addition of more of inert microporous polymer structure, in this case ePTFE, while total acid content of the membranes was kept constant leads to improved fuel cell performance of multilayer composite membranes used in fuel cell application regardless of thickness in the range 4.9-14.5 micron of multilayer composite membranes or type of microporous polymer used or whether one or more microporous polymer is present or what IEM is used. This is a surprising and unexpected finding. The increase or the improvement in the selectivity is illustrated with line 316, shown in graph 300 of FIG. 3A and graph 350 of FIG. 3B.

Additionally, by increasing the final mass of the microporous polymer structure (e.g., the ePTFE) in Example 8.2 as compared to Example 8.1, it was possible to lower the final mass of the ion exchange material (e.g., perfluoro sulfonic acid resin) in Example 8.2 as compared to Example 8.1. This resulted in an increase in the overall volume of the microporous polymer structure from 27.1% in Example 8.1 to 42.6% in Example 8.2, which consequently improved reinforcement for the composite membrane and a lowed the cost to manufacture the composite membrane (i.e., a decrease in the final mass of the costly ion exchange material that was used to manufacture the composite membrane).

Series 9

Comparative Example 9.1

Comparative example 9.1 was made according to the following procedure. An ePTFE membrane 1 with mass per area of 0.6 g/m$^2$, a thickness of 3.6 μm, an apparent density of 0.17 g/cc and a bubble point of 75.0 psi was hand strained to eliminate wrinkles and restrained in this state by a metal frame. Next, a first laydown of PSFA solution with EV=509 cc/mole eq (D2020 obtained from Ion Power Inc., USA) cc/mole eq, solution composition of 23.5% water, 60.5% ethanol, 16% solids, was coated onto the top side of a polymer sheet substrate. The polymer sheet substrate (obtained from DAICEL VALUE COATING LTD., Japan) comprises PET and a protective layer of cyclic olefin copolymer (COC), and was oriented with the COC side on top. The IEM (PFSA solution) coating was accomplished using a meyer bar with nominal wet coating thickness of 2.2 mils. While the coating was still wet, the ePTFE membrane 1 previously restrained on metal frame was laminated to the coating, whereupon the IEM solution imbibed into the pores. This composite material was subsequently dried in a convection oven with air inside at a temperature of 165° C. Upon drying, the microporous polymer structure (ePTFE membrane) became fully imbibed with the IEM. The IEM also formed a layer between the bottom surface of the microporous polymer substrate and the polymer sheet substrate. On the second laydown, a solution of IEM blend was coated onto the top surface of the composite material (the surface opposite the polymer sheet substrate) using a drawdown bar with nominal wet coating thickness of 2 mil. The solution of IEM blend was produced by mixing two ionomers, D2020 and D2021 (obtained from Ion Power Inc., USA), in a plastic bottle using a stir bar. First, the 9.98 g of D2020 solution at 21.06% ionomer by weight with EV=509 cc/mole eq were poured into the bottle. Next, 10.96 g of D2021 solution at 21.15% ionomer by weight with EV=560 cc/mole eq were poured into the same bottle. Finally, 914 g of 200 proof ethanol was added to adjust the concentration of solids and solvents in the blend. A magnetic stir bar was placed inside and the bottle was left on a magnetic stir plate for 24 hours. The resulting solution of ion exchange material blend had 14.7% of ionomer solids, 21.6% water, and 63.7% ethyl alcohol by weight. The resulting ion exchange material blend had EV=535 cc/mole eq. The composite material was then dried again at 165° C., at which point it was largely transparent, indicating a full impregnation of the microporous polymer structure. The multilayer composite membrane was fully occlusive and had a layer of IEM on each side of the microporous polymer matrix with those layers of IEM having unequal equivalent volume and top layer being made from a blend of ionomers. The resulting multilayer composite membrane had thickness at 0% RH of 7.3 micron, 3.6% by volume occupied by microporous polymer structure, and acid content of 1.8 meq/cc.

Results of proton to hydrogen gas transport selectivity measurements are listed in table 9.

Inventive Example 9.2

Inventive example 9.2 was prepared according to the same procedure as described above and the one used for comparative example 9.1 except that different materials were used with mass per area of 3.0 g/m$^2$, a thickness of 15.2 μm, an apparent density of 0.20 g/cc and a bubble point of 36.6 psi was used as microporous polymer matrix. A PSFA solution as IEM with EV=413 cc/mole eq (obtained from Shanghai Gore 3F Fluoromaterials Co., LTD., China), solution composition of 17.3% water, 71.5% ethanol, 11.2% solids, was coated on first laydown using a meyer bar with nominal wet coating thickness of 4 mil. On the second laydown, a solution of IEM blend was coated onto the top surface of the composite material (the surface opposite the polymer sheet substrate) using a drawdown bar with nominal wet coating thickness of 3 mil. The solution of IEM blend was produced by mixing two ionomers, PSFA IEM solution with EV=413 and EV=458 cc/mole eq (obtained from Shanghai Gore 3F Fluoromaterials Co., LTD., China), in a plastic bottle using a stir bar. First, the 10.0 g of EV=413 cc/mole eq IEM solution with 21.06% ionomer by weight were poured into the bottle. Next, 5.2 g of EV=458 cc/mole eq. IEM solution with 21.15% ionomer by weight were poured into the same bottle. Finally, 30.5 g of 200 proof ethanol and 2.0 g of DI water were added to adjust the concentration of solids and solvents in the blend. A magnetic stir bar was placed inside and the bottle was left on a magnetic stir plate for 24 hours. The resulting solution of ion exchange material blend had 4.5% of ionomer solids, 10.0% water, and 85.5% ethyl alcohol by weight. The resulting ion exchange material blend had EV=434 cc/mole eq. The composite membrane was fully occlusive and had a layer of IEM on each side of the microporous polymer substrate with those layers of IEM having unequal equivalent volume and top layer being made from a blend of ionomers. The resulting composite membrane had thickness at 0% RH of 7.6 micron, 17.6% by volume occupied by microporous polymer structure, and acid content of 2.0 meq/cc.

Results of proton to hydrogen gas transport selectivity measurements are listed in table 9.

Table 9 shows results of the various test procedures for the composite material of Comparative Example 9.1 and the Inventive Example 9.2.

TABLE 9

| | | | Composite membrane | | | |
|---|---|---|---|---|---|---|
| | | dry thickness (μm) | Microporous polymer structure Vol % | Total volume Vol % | Acid concentration (meq/cc) | Structure | Selectivity (MPa/mV) |
| 9.1 | Comparative | 7.3 | 3.60% | 100 | 1.8 | fully imbibed with 2 BC, Ionomer layers, top layer is blend | 0.4 |
| 9.2 | inventive | 7.6 | 17.60% | 100 | 2 | fully imbibed with 2 BC, Ionomer layers, top layer is blend | 0.6 |

As shown in Table 9, the composite membranes of Example 9.1 and Example 9.2 have the similar thickness (i.e., 7.3 and 7.6 microns, respectively) and similar total acid content (i.e., 1.8 and 2 meq/cc, respectively). Therefore, the composite membranes of Example 9.1 and Example 9.2 have similar conductance characteristics as demonstrated by the resistivity measurements. It was surprisingly and unexpectedly discovered, however, that the variations in the final mass of the microporous polymer structure (e.g., the expanded porous polytetrafluoroethylene) and the ion exchange material (e.g., perfluoro sulfonic acid resin) created very different permeance characteristics in the composite membranes. For example, the composite membrane of Example 9.2 demonstrated improved or increased selectivity compared to that of the composite membrane of Example 9.1 (i.e., 0.6 MPA/mV for Example 9.2 compared to 0.4 MPA/mV for Example 9.1 at 50% RH). The increase or the improvement in the selectivity is illustrated with line 318, shown in graph 300 of FIG. 3A and graph 350 of FIG. 3B.

Additionally, by increasing the final mass of the microporous polymer structure (e.g., the ePTFE) in Example 9.2 as compared to Example 9.1, it was possible to lower the final mass of the ion exchange material (e.g., perfluoro sulfonic acid resin) in Example 9.2 as compared to Example 9.1. This resulted in an increase in the overall volume of the microporous polymer structure from 3.6% in Example 9.1 to 17.6% in Example 9.2, which consequently improved reinforcement for the composite membrane (and a lowered the cost to manufacture the composite membrane (i.e., a decrease in the final mass of the costly ion exchange material that was used to manufacture the composite membrane).

Series 10

Comparative Example 10.1

Comparative example 10.1 was made according to the following procedure. An ePTFE membrane 1 with mass per area of 0.6 g/m², a thickness of 3.6 μm, an apparent density of 0.17 g/cc and a bubble point of 75.0 psi was hand strained to eliminate wrinkles and restrained in this state by a metal frame. Next, a first laydown of PFSA solution as IEM with EV=560 cc/mole eq (D2021 obtained from Ion Power Inc., USA), solution composition of 26.2% water, 57.3% ethanol, 16.5% solids, was coated onto the top side of a polymer sheet substrate. The polymer sheet substrate (obtained from DAICEL VALUE COATING LTD., Japan) comprises PET and a protective layer of cyclic olefin copolymer (COC), and was oriented with the COC side on top. The IEM (PFSA solution) coating was accomplished using a meyer bar with nominal wet coating thickness of 3.0 mils. While the coating was still wet, the ePTFE membrane 1 previously restrained on metal frame was laminated to the coating, whereupon the IEM solution imbibed into the pores. This composite material was subsequently dried in a convection oven with air inside at a temperature of 165° C. Upon drying, the microporous polymer structure (ePTFE membrane) became fully imbibed with the IEM. The IEM also formed a layer between the bottom surface of the microporous polymer substrate and the polymer sheet substrate. On the second laydown, PFSA solution as IEM with EV=509 cc/mole eq (D2020 obtained from Ion Power Inc., USA), solution composition of 23.5% water, 60.5% ethanol, 16.0% solids, was coated onto the top surface of the composite material (the surface opposite the polymer sheet substrate) using a drawdown bar with nominal wet coating thickness of 3 mil. The composite material was then dried again at 165° C., at which point it was largely transparent, indicating a full impregnation of the microporous polymer structure. The multilayer composite membrane was fully occlusive and had layers of IEMs on each side of the microporous polymer matrix with those layers of IEM having unequal equivalent volume. The resulting multilayer composite membrane had thickness at 0% RH of 8.8 micron, 3.0% by volume occupied by microporous polymer structure, and acid content of 1.8 meq/cc.

Results of proton to hydrogen gas transport selectivity measurements are listed in table 10.

Inventive example 10.2

Inventive example 10.2 was prepared according to the same procedure as described above and the one used for comparative example 10.1 except that different materials were used. An ePTFE membrane 11 with mass per area of 4.8 g/m², a thickness of 14.8 μm, an apparent density of 0.33 g/cc and a bubble point of 68.4 psi was used as microporous polymer structure. A PSFA solution as IEM with EV=458 cc/mole eq (obtained from Shanghai Gore 3F Fluoromaterials Co., LTD., China), solution composition of 20.2% water, 60.0% ethanol, 19.8% solids, was coated on first laydown using a drawdown bar with nominal wet coating thickness of 4 mil. On the second laydown, a PFSA solution as IEM with EV=347 cc/mole eq (obtained from Shanghai Gore 3F Fluoromaterials Co., LTD., China), solution composition of 39.6% water, 41.3% ethanol, 19.1% solids, was coated onto the top surface of the composite material (the surface opposite the polymer sheet substrate) using a drawdown bar with nominal wet coating thickness of 1 mil. The composite membrane was fully occlusive and had a layer of IEM on each side of the microporous polymer substrate with those layers of IEM having unequal equivalent volume. The resulting composite membrane had thickness at 0% RH of 10.3 micron, 20.8% by volume occupied by microporous polymer structure, and acid content of 1.9 meq/cc.

Table 10 shows results of the various test procedures for the composite material of Comparative Example 10.1 and the Inventive Example 10.2.

TABLE 10

| | | Composite membrane | | | | |
|---|---|---|---|---|---|---|
| | | dry thickness (μm) | Microporous polymer structure Vol % | Total volume Vol % | Acid concentration (meq/cc) | Structure | Selectivity (MPa/mV) |
| 10.1 | Comparative | 8.8 | 3.00% | 100 | 1.8 | fully imbibed with 2 BC, Ionomer layers | 0.4 |
| 10.2 | inventive | 10.3 | 20.80% | 100 | 1.9 | fully imbibed with 2 BC, Ionomer layers | 0.6 |

As shown in Table 10, the composite membranes of Example 10.1 and Example 10.2 have the similar thickness (i.e., 8.8 and 10.3 microns, respectively) and similar total acid content (i.e., 1.8 and 1.9 meq/cc, respectively). Therefore, the composite membranes of Example 10.1 and Example 10.2 have similar conductance characteristics as demonstrated by the resistivity measurements. It was surprisingly and unexpectedly discovered, however, that the variations in the final mass of the microporous polymer structure (e.g., the expanded porous polytetrafluoroethylene) and the ion exchange material (e.g., perfluoro sulfonic acid resin) created very different permeance characteristics in the composite membranes. For example, the composite membrane of Example 10.2 demonstrated improved or increased selectivity compared to that of the composite membrane of Example 10.1 (i.e., 0.6 MPA/mV for Example 10.2 compared to 0.4 MPA/mV for Example 10.1 at 50% RH). The increase or the improvement in the selectivity is illustrated with line 320, shown in graph 300 of FIG. 3A and graph 350 of FIG. 3B.

Combined data from examples series 1-10 indicate that addition of more of inert microporous polymer structure, in this case ePTFE, while total acid content of the membranes was kept constant leads to improved fuel cell performance of multilayer composite membranes used in fuel cell application regardless of thickness in the range 4.9-14.5 micron of multilayer composite membranes or type of microporous polymer used or whether one or more microporous polymer is present or what IEM is used or whether IEM are made from blends or whether composite membranes have same IEM on both sides of the occluded microporous polymer structure. This is a surprising and unexpected finding.

Additionally, by increasing the final mass of the microporous polymer structure (e.g., the ePTFE) in Example 10.2 as compared to Example 10.1, it was possible to lower the final mass of the ion exchange material (e.g., perfluoro sulfonic acid resin) in Example 10.2 as compared to Example 10.1. This resulted in an increase in the overall volume of the microporous polymer structure from 3% in Example 10.1 to 20.8% in Example 10.2, which consequently improved reinforcement for the composite membrane and a lowed the cost to manufacture the composite membrane (i.e., a decrease in the final mass of the costly ion exchange material that was used to manufacture the composite membrane).

Series 11

Comparative Example 11.1

Comparative example 11.1 was made according to the following procedure. Two sheets of ePTFE membrane 1 with mass per area of 0.6 g/m², a thickness of 3.6 μm, an apparent density of 0.17 g/cc and a bubble point of 75.0 psi were hand strained to eliminate wrinkles and restrained in this state on two metal frames. Next, a first laydown of PSFA solution as IEM with EV=509 cc/mole eq (D2020 obtained from Ion Power Inc., USA), solution composition of 22.1% water, 62.9% ethanol, 15% solids, was coated onto the top side of a polymer sheet substrate. The polymer sheet substrate (obtained from DAICEL VALUE COATING LTD., Japan) comprises PET and a protective layer of cyclic olefin copolymer (COC), and was oriented with the COC side on top. The IEM (PFSA solution) coating was accomplished using a meyer bar with nominal wet coating thickness of 2.2 mils. While the coating was still wet, the first ePTFE membrane 1 previously restrained on metal frame was laminated to the coating, whereupon the IEM solution imbibed into the pores. This composite material was subsequently dried in a convection oven with air inside at a temperature of 165° C. Upon drying, the microporous polymer structure (ePTFE membrane) became fully imbibed with the IEM. The IEM also formed a layer between the bottom surface of the microporous polymer substrate and the polymer sheet substrate. On the second laydown, same solution of IEM was coated onto the top surface of the composite material (the surface opposite the polymer sheet substrate) using a drawdown bar with nominal wet coating thickness of 3 mil. While the coating was still wet, the second ePTFE membrane 1 previously restrained on metal frame was laminated to the coating, whereupon the IEM solution imbibed into the pores. The composite material was then dried again at 165° C. Upon drying, the second microporous polymer structure (ePTFE membrane) became fully imbibed with the second laydown of IEM. The second laydown of IEM also formed a layer between the two layers of the microporous polymer substrate. On the third laydown, same solution of IEM was coated onto the top surface of the composite material (the surface opposite the polymer sheet substrate) using a drawdown bar with nominal wet coating thickness of 2 mil. The composite material was then dried again at 165° C., at which point it was largely transparent, at which point it was largely transparent, indicating a full impregnation of the microporous polymer structures. The multilayer composite membrane was fully occlusive and had a layer of IEM on each side and in between of the two fully occluded microporous polymer layers. The resulting multilayer composite membrane had thickness at 0% RH of 11.4 micron, 4.7% by volume occupied by microporous polymer structure, and acid content of 1.9 meq/cc. Results of proton to hydrogen gas transport selectivity measurements are listed in table 11.

Inventive Example 11.2

Inventive example 11.2 was prepared according to the same procedure as described above and the one used for comparative example 11.1 except that different materials were used. A first ePTFE membrane 4 with mass per area of 2.8 g/m², a thickness of 9.6 μm, an apparent density of 0.29 g/cc and a bubble point of 34.4 psi was used as microporous polymer structure. A PSFA solution as IEM with EV=413 cc/mole eq (obtained from Shanghai Gore 3F Fluoromaterials Co., LTD., China), solution composition of 17.3% water, 71.5% ethanol, 11.2% solids, was coated on first laydown using a drawdown bar with nominal wet coating thickness of 3 mil. On the second laydown, same solution of IEM was coated onto the top surface of the composite material (the surface opposite the polymer sheet substrate) using a drawdown bar with nominal wet coating thickness of 4 mil. While the coating was still wet, the second ePTFE membrane 4 previously restrained on metal frame was laminated to the coating, whereupon the IEM solution imbibed into the pores. On the third laydown, a PSFA solution as IEM with EV=413 cc/mole eq (obtained from Shanghai Gore 3F Fluoromaterials Co., LTD., China), solution composition of 6.2% water, 89.8% ethanol, 4.0% solids, was coated onto the top surface of the composite material (the surface opposite the polymer sheet substrate) using a drawdown bar with nominal wet coating thickness of 3 mil. The multilayer composite membrane was fully occlusive and had a layer of IEM on each side and in between of the two fully occluded microporous polymer layers. The resulting composite membrane had thickness at 0% RH of 9.4 micron, 26.4% by volume occupied by microporous polymer structure, and acid content of 1.8 meq/cc. Results of proton to hydrogen gas transport selectivity measurements are listed in table 11.

Table 11 shows results of the various test procedures for the composite material of Comparative Example 11.1 and the Inventive Example 11.2.

TABLE 11

| | | Composite membrane | | | | |
|---|---|---|---|---|---|---|
| | | dry thickness (μm) | Microporous polymer structure Vol % | Total volume Vol % | Acid concentration (meq/cc) | Structure | Selectivity (MPa/mV) |
| 11.1 | Comparative | 11.4 | 4.70% | 100 | 1.9 | fully imbibed with 2 BC, Two ePTFE layers | 0.4 |
| 11.2 | inventive | 9.4 | 26.40% | 100 | 1.8 | fully imbibed with 2 BC, Two ePTFE layers | 0.5 |

As shown in Table 11, the composite membranes of Example 11.1 and Example 11.2 have the similar thickness (i.e., 11.4 and 9.4 microns, respectively) and similar total acid content (i.e., 1.9 and 1.8 meq/cc, respectively). Therefore, the composite membranes of Example 11.1 and Example 11.2 have similar conductance characteristics as demonstrated by the resistivity measurements. It was surprisingly and unexpectedly discovered, however, that the variations in the final mass of the microporous polymer structure (e.g., the expanded porous polytetrafluoroethylene) and the ion exchange material (e.g., perfluoro sulfonic acid resin) created very different permeance characteristics in the composite membranes. For example, the composite membrane of Example 11.2 demonstrated improved or increased selectivity compared to that of the composite membrane of Example 11.1 (i.e., 0.5 MPA/mV for Example 11.2 compared to 0.4 MPA/mV for Example 11.1 at 50% RH). The increase or the improvement in the selectivity is illustrated with line 322, shown in graph 300 of FIG. 3A and graph 350 of FIG. 3B.

Combined data from examples series 1-11 indicate that addition of more of inert microporous polymer structure, in this case ePTFE, while total acid content of the membranes was kept constant leads to improved fuel cell performance of multilayer composite membranes used in fuel cell application regardless of thickness in the range 4.9-14.5 micron of multilayer composite membranes or type of microporous polymer used or whether one or more microporous polymer is present or whether multiple occluded microporous polymer layers touch or are separated by a layer of IEM or what IEM is used or whether IEM are made from blends or whether composite membranes have same IEM on both sides of the occluded microporous polymer structure. This is a surprising and unexpected finding.

Additionally, by increasing the final mass of the microporous polymer structure (e.g., the ePTFE) in Example 11.2 as compared to Example 11.1, it was possible to lower the final mass of the ion exchange material (e.g., perfluoro sulfonic acid resin) in Example 11.2 as compared to Example 11.1. This resulted in an increase in the overall volume of the microporous polymer structure from 4.7% in Example 11.1 to 26.4% in Example 11.2, which consequently improved reinforcement for the composite membrane (and a lowed the cost to manufacture the composite membrane (i.e., a decrease in the final mass of the costly ion exchange material that was used to manufacture the composite membrane).

Series 12

Comparative Example 12.1

Comparative example 12.1 was prepared according to the same procedure as the one used for comparative example 1.1 except that different materials were used. An ePTFE membrane 1 with mass per area of 0.6 g/m², a thickness of 3.6 μm, an apparent density of 0.17 g/cc and a bubble point of 75.0 psi was used as microporous polymer matrix. A solution of IEM with EV=509 cc/mole eq (D2020 obtained from Ion Power Inc., USA), solution composition of 22.1% water, 62.9% ethanol, 15% solids, was coated on first laydown using a meyer bar with nominal wet coating thickness of 0.6 mil. On the second laydown, same solution of IEM was coated onto the top surface of the composite material (the surface opposite the substrate) using a drawdown bar with nominal wet coating thickness of 0.5 mil. The multilayer composite membrane was fully occlusive and had a layer of IEM on each side of the microporous polymer matrix. The resulting multilayer composite membrane had thickness at 0% RH of 2.2 micron, 11.9% by volume occupied by microporous polymer structure, and acid content of 1.7 meq/cc.

Results of proton to hydrogen gas transport selectivity measurements are listed in table 12.

Inventive Example 12.2

Inventive example 12.2 was prepared according to the same procedure as the one used for comparative example 10.1 except that different materials were used. An ePTFE membrane 3 with mass per area of 1.2 g/m², a thickness of 5.4 μm, an apparent density of 0.23 g/cc and a bubble point of 38.0 psi was used as microporous polymer matrix. A solution of IEM with EV=458 cc/mole eq (obtained from Shanghai Gore 3F Fluoromaterials Co., LTD., China), solution composition of 13.0% water, 74.7% ethanol, 12.3% solids, was coated on first laydown using a meyer bar with nominal wet coating thickness of 0.9 mil. On the second laydown, a solution of IEM with EV=413 cc/mole eq (obtained from Shanghai Gore 3F Fluoromaterials Co., LTD., China), solution composition of 5.5% water, 94.0% ethanol, 0.5% solids, was coated onto the top surface of the composite material (the surface opposite the substrate) using a drawdown bar with nominal wet coating thickness of 5 mil. The multilayer composite membrane was fully occlusive and had a layer of IEM on each side of the microporous polymer matrix. The resulting multilayer composite membrane had thickness at 0% RH of 2.5 micron, 21.2% by volume occupied by microporous polymer structure, and acid content of 1.8 meq/cc.

Table 12 shows results of the various test procedures for the composite material of Comparative Example 12.1 and the Inventive Example 12.2.

TABLE 12

| | | Composite membrane | | | | |
|---|---|---|---|---|---|---|
| | | dry thickness (μm) | Microporous polymer structure Vol % | Total volume Vol % | Acid concentration (meq/cc) | Structure | Selectivity (MPa/mV) |
| 12.1 | Comparative | 2.2 | 11.90% | 100 | 1.7 | fully imbibed with 2 BC, ultrathin, ionomer layers | 0.3 |
| 12.2 | inventive | 2.5 | 21.20% | 100 | 1.8 | fully imbibed with 2 BC, ultrathin, ionomer layers | 0.4 |

As shown in Table 12, the composite membranes of Example 12.1 and Example 12.2 have the similar thickness (i.e., 2.2 and 2.5 microns, respectively) and similar total acid content (i.e., 1.7 and 1.8 meq/cc, respectively). Therefore, the composite membranes of Example 12.1 and Example 12.2 have similar conductance characteristics as demonstrated by the resistivity measurements. It was surprisingly and unexpectedly discovered, however, that the variations in the final mass of the microporous polymer structure (e.g., the expanded porous polytetrafluoroethylene) and the ion exchange material (e.g., perfluoro sulfonic acid resin) created very different permeance characteristics in the composite membranes. For example, the composite membrane of Example 12.2 demonstrated improved or increased selectivity compared to that of the composite membrane of Example 12.1 (i.e., 0.4 MPA/mV for Example 12.2 compared to 0.3 MPA/mV for Example 12.1 at 50% RH). The increase or the improvement in the selectivity is illustrated with line 324, shown in graph 300 of FIG. 3A and graph 350 of FIG. 3B.

Combined data from examples series 1-11 indicate that addition of more of inert microporous polymer structure, in this case ePTFE, while total acid content of the membranes was kept constant leads to improved fuel cell performance of multilayer composite membranes used in fuel cell application regardless of thickness in the range 2.5-14.5 micron of multilayer composite membranes or type of microporous polymer used or whether one or more microporous polymer is present or whether multiple occluded microporous polymer layers touch or are separated by a layer of IEM or what IEM is used or whether IEM are made from blends or whether composite membranes have same IEM on both sides of the occluded microporous polymer structure. This is a surprising and unexpected finding.

Additionally, by increasing the final mass of the microporous polymer structure (e.g., the ePTFE) in Example 12.2 as compared to Example 12.1, it was possible to lower the final mass of the ion exchange material (e.g., perfluoro sulfonic acid resin) in Example 12.2 as compared to Example 12.1. This resulted in an increase in the overall volume of the microporous polymer structure from 11.9% in Example 12.1 to 21.20% in Example 12.2, which consequently improved reinforcement for the composite membrane and a lowed the cost to manufacture the composite membrane (i.e., a decrease in the final mass of the costly ion exchange material that was used to manufacture the composite membrane).

Series 13

Series 13 includes only two comparative examples where no reinforcements are provided. Accordingly, the composite membranes of Comparative Examples 13.1 and 13.2 do not include a microporous polymer structure. The composite membrane used in Example 13.1 is a non-reinforced membrane, Nafion® Membrane 211 obtained from Ion Power Inc., USA. The composite membrane used in Example 13.2 is a non-reinforced membrane, Nafion® Membrane 212 obtained from Ion Power Inc., USA.

Table 13 shows results of the various test procedures for the composite material of Comparative Examples 13.1 and 13.2.

TABLE 13

| | | Composite membrane | | | | | | | |
|---|---|---|---|---|---|---|---|---|---|
| | | dry thickness (μm) | Microporous polymer structure Vol % | Total volume Vol % | Acid concentration (meq/cc) | Structure | H+ Conductance (Siemens/cm2) | H2 Permeance (mAAMPA* cm2)) | Selectivity (MPa/mV) |
| 13.1 | comparative | 23.9 | 0.00% | 100 | 1.8 | No reinforcement | 10.81 | 22.57 | 0.5 |
| 13.2 | comparative | 47.7 | 0.00% | 100 | 1.8 | No reinforcement | 5.67 | 10.99 | 0.5 |

As shown in Table 13, the composite membranes of Example 13.1 and Example 13.2 the same total acid content (i.e., 1.8 meq/cc) and the same selectivity (i.e. 0.5 MPA/mV) even though have different thicknesses (i.e., 23.9 and 47.7 microns, respectively). Table 13 further provides the proton conductance resistance) and the hydrogen permeance (i.e.

H$_2$ Resistance) of the Nafion composite membranes. These membranes are commercially available and can be used as reference materials. The selectivity of the comparative examples 13.1 and 13.2 is illustrated using the data point 326 in graph 300 of FIG. 3A and graph 350 of FIG. 3B.

Series 14

Comparative Example 14.1

Comparative example 14.1 was made according to the following procedure. A track etched polycarbonate porous membrane 12, with mass per area of 7.9 g/m$^2$, a thickness of 9.3 µm, an apparent density of 85 g/cc and a bubble point of 0.9 psi was obtained from Structure Probe, Inc., USA, part number E14047-MB. This porous membrane exhibits enough stiffness that the porous membrane did not need to be restrained on a metal frame. Next, a first laydown of PFSA solution as IEM with EV=413 cc/mole eq (obtained from Shanghai Gore 3F Fluoromaterials Co., LTD., China), solution composition of 17.3% water, 71.5% ethanol, 11.2% solids, was coated onto the top side of a polymer sheet substrate. The polymer sheet substrate (obtained from DAICEL VALUE COATING LTD., Japan) comprises PET and a protective layer of cyclic olefin copolymer (COC), and was oriented with the COC side on top. The IEM (PFSA solution) coating was accomplished using a drawdown bar with nominal wet coating thickness of 1.5 mils. While the coating was still wet, the track etched polycarbonate porous membrane 12 was laminated to the coating, whereupon the IEM solution imbibed into the pores. This composite material was subsequently dried in a convection oven with air inside at a temperature of 95° C. Upon drying, the microporous polymer structure (track etched polycarbonate porous membrane) became fully imbibed with the IEM. The IEM also formed a layer between the bottom surface of the microporous polymer substrate and the polymer sheet substrate. On the second laydown, same solution of IEM was coated onto the top surface of the composite material (the surface opposite the polymer sheet substrate) using a drawdown bar with nominal wet coating thickness of 4 mil. The composite material was then dried again at 95° C., at which point it was largely transparent, indicating a full impregnation of the microporous polymer structure. The multilayer composite membrane was fully occlusive and had layers of IEMs on each side of the microporous polymer matrix with those layers of IEM having unequal equivalent volume. The resulting multilayer composite membrane had thickness at 0% RH of 12.3 micron, 53.4% by volume occupied by microporous polymer structure, and acid content of 1.1 meq/cc.

Results of proton to hydrogen gas transport selectivity measurements are listed in table 14.

Inventive Example 14.2

Inventive example 14.2 was prepared according to the same procedure as described above in connection with the comparative example 14.1 except that different materials were used. A track etched polycarbonate porous membrane 13 with mass per area of 10.37 g/m$^2$, a thickness of 12.3 µm, an apparent density of 0.85 g/cc and a bubble point of 1.1 psi was obtained from Structure Probe, Inc., USA, part number E20047-MB. This porous membrane exhibits enough stiffness that the porous membrane did not need to be restrained on a metal frame. Next, a first laydown of PFSA solution as IEM with EV=311 cc/mole eq (obtained from Shanghai Gore 3F Fluoromaterials Co., LTD., China), solution composition of 21.5% water, 65.5% ethanol, 13.0% solids, was coated onto the top side of a polymer sheet substrate. The polymer sheet substrate (obtained from DAICEL VALUE COATING LTD., Japan) comprises PET and a protective layer of cyclic olefin copolymer (COC), and was oriented with the COC side on top. The IEM (PFSA solution) coating was accomplished using a drawdown bar with nominal wet coating thickness of 1 mils. While the coating was still wet, the track etched polycarbonate porous membrane 13 was laminated to the coating, whereupon the IEM solution imbibed into the pores. This composite material was subsequently dried in a convection oven with air inside at a temperature of 95° C. Upon drying, the microporous polymer structure (track etched polycarbonate porous membrane) became fully imbibed with the IEM. The IEM also formed a layer between the bottom surface of the microporous polymer substrate and the polymer sheet substrate. On the second laydown, same solution of IEM was coated onto the top surface of the composite material (the surface opposite the polymer sheet substrate) using a drawdown bar with nominal wet coating thickness of 2 mil. The composite material was then dried again at 95° C., at which point it was largely transparent, indicating a full impregnation of the microporous polymer structure. The multilayer composite membrane was fully occlusive and had layers of IEMs on each side of the microporous polymer matrix with those layers of IEM having unequal equivalent volume. The resulting multilayer composite membrane had thickness at 0% RH of 13.5 micron, 64.0% by volume occupied by microporous polymer structure, and acid content of 1.2 meq/cc.

Table 14 shows results of the various test procedures for the composite material of Comparative Example 14.1 and the Inventive Example 14.2.

TABLE 14

| | | Composite membrane | | | | |
|---|---|---|---|---|---|---|
| | | dry thickness (µm) | Microporous polymer structure Vol % | Total volume Vol % | Acid concentration (meq/cc) | Structure | Selectivity (MPa/mV) |
| 14.1 | comparative | 12.3 | 53.4% | 100 | 1.1 | fully imbibed with 2 BC | 0.081 |
| 14.2 | Inventive | 13.5 | 64.0% | 100 | 1.2 | fully imbibed with 2 BC | 0.094 |

As shown in Table 14, the composite membranes of Example 14.1 and Example 14.2 have the similar thickness (i.e., 12.3 and 13.5 microns, respectively) and similar total acid content (i.e., 1.1 and 1.2 meq/cc, respectively). Therefore, the composite membranes of Example 14.1 and Example 14.2 have similar conductance characteristics as demonstrated by the resistivity measurements. It was surprisingly and unexpectedly discovered, however, that the variations in the final mass of the microporous polymer structure (e.g., the track etched porous polycarbonate) and the ion exchange material (e.g., perfluoro sulfonic acid resin) created very different permeance characteristics in the composite membranes. For example, the composite membrane of Example 14.2 demonstrated improved or increased selectivity compared to that of the composite membrane of Example 14.1 (i.e., 0.094 MPA/mV for Example 14.2 compared to 0.081 MPA/mV for Example 14.1 at 50% RH). The increase or the improvement in the selectivity is illustrated with line 328, shown in graph 300 of FIG. 3A and graph 350 of FIG. 3B.

Combined data from examples series 1-14 indicate that the addition of more of inert microporous polymer structure, such as perfluorinated ePTFE and hydrocarbon track etched porous polycarbonate, while keeping the total acid content of the membranes constant leads to improved fuel cell performance of multilayer composite membranes used in fuel cell applications regardless of (a) thickness in the range 2.5-14.5 micron of multilayer composite membranes, or (b) type of microporous polymer used, or (c) whether one or more microporous polymer is present, or (d) what IEM is used, or (e) whether IEM are made from blends, or (f) whether composite membranes have same IEM on both sides of the occluded microporous polymer structure. This is a surprising and unexpected finding.

While the invention has been described in detail, modifications within the spirit and scope of the invention will be readily apparent to the skilled artisan. It may be understood that aspects of the invention and portions of various embodiments and various features recited above and/or in the appended claims may be combined or interchanged either in whole or in part. In the foregoing descriptions of the various embodiments, those embodiments which refer to another embodiment may be appropriately combined with other embodiments as will be appreciated by the skilled artisan. Furthermore, the skilled artisan will appreciate that the foregoing description is by way of example only, and is not intended to limit the invention.

We claim:

1. A composite membrane, comprising:
   a) a microporous polymer structure present in an amount from 13 vol % to 65 vol % based on the total volume of the composite membrane; and
   b) an ion exchange material at least partially embedded within the microporous polymer structure and configured to render the microporous polymer structure occlusive,
   wherein the ion exchange material has an equivalent volume equal to or less than 460 cc/mole eq;
   wherein a thickness of the composite membrane is less than 17 microns while an acid content of the composite membrane is from 1.2 meq/cc to 3.5 meq/cc, wherein the composite membrane has an equivalent volume, an acid content and a thickness determined at 0% relative humidity.

2. The composite membrane of claim 1, wherein the ion exchange material comprises more than one layer of ion exchange material,
   wherein the layers of ion exchange material comprise the same ion exchange material,
   wherein the average equivalent volume of all the layers of ion exchange material is equal to or less than 460 cc/mole eq.

3. The composite membrane of claim 1, wherein the ion exchange material comprises more than one layer of ion exchange material,
   wherein a first layer of ion exchange material comprises an ion exchange material selected from the group consisting of perfluorosulfonic acid polymers, perfluorocarboxylic acid polymers, perfluorophosphonic acid polymers, styrenic ion exchange polymers, fluorostyrenic ion exchange polymers, polyarylether ketone ion exchange polymers, polysulfone ion exchange polymers, bis(fluoroalkylsulfonyl)imides, (fluoroalkylsulfonyl)(fluorosulfonyl)imides, polyvinyl alcohol, polyethylene oxides, divinyl benzene, metal salts with or without a polymer, and mixtures thereof, and wherein a second layer of ion exchange material comprises an ion exchange material selected from the group consisting of perfluorosulfonic acid polymers, perfluorocarboxylic acid polymers, perfluorophosphonic acid polymers, styrenic ion exchange polymers, fluorostyrenic ion exchange polymers, polyarylether ketone ion exchange polymers, polysulfone ion exchange polymers, bis(fluoroalkylsulfonyl)imides, (fluoroalkylsulfonyl)(fluorosulfonyl)imides, polyvinyl alcohol, polyethylene oxides, divinyl benzene, metal salts with or without a polymer, and mixtures thereof,
   wherein the average equivalent volume of all the layers of ion exchange material is equal to or less than 460 cc/mole eq.

4. The composite membrane of claim 1, wherein the ion exchange material is fully embedded within the microporous polymer structure.

5. The composite membrane of claim 1, wherein the microporous polymer structure has a first surface and a second surface; and
   wherein the ion exchange material is a layer on one of the first surface or the second surface.

6. The composite membrane of claim 1,
   wherein the microporous polymer structure has a first surface and a second surface; and
   wherein the ion exchange material is a layer on both the first surface and the second surface.

7. The composite membrane of claim 1,
   wherein the microporous polymer structure has a first surface and a second surface, and
   wherein the ion exchange material is partially embedded within the microporous polymer structure such that the microporous polymer structure comprises a non-occlusive portion closest to at least one of the first surface or the second surface.

8. The composite membrane of claim 7, wherein the non-occlusive portion is free of any of the ion exchange material.

9. The composite membrane of claim 7, wherein the non-occlusive portion comprises a coating of ion exchange material to an internal surface of the microporous polymer structure.

10. The composite membrane of claim 1, wherein the microporous polymer structure comprises at least two microporous polymer layers and wherein the at least two microporous polymer layers are the same.

11. The composite membrane of claim 1, wherein the microporous polymer structure comprises at least two microporous polymer layers and wherein a composition of a first microporous polymer layer of the at least two microporous polymer layers is selected from the group consisting of fluoropolymers, chlorinated polymers, hydrocarbons, polyamides, polycarbonates, polyacrylates, polysulfones, copolyether esters, polyethylene, polypropylene, polyvinylidene fluoride, polyaryl ether ketones, polybenzimidazoles, poly(ethylene-co-tetrafluoroethylene), poly(tetrafluoroethylene-co-hexafluoropropylene) and a composition of a second microporous polymer layer of the at least two microporous polymer layers is selected from the group consisting of fluoropolymers, chlorinated polymers, hydrocarbons, polyamides, polycarbonates, polyacrylates, polysulfones, copolyether esters, polyethylene, polypropylene, polyvinylidene fluoride, polyaryl ether ketones, polybenzimidazoles, poly(ethylene-co-tetrafluoroethylene), poly(tetrafluoroethylene-co-hexafluoropropylene).

12. The composite membrane of claim 10, wherein at least two of the at least two microporous polymer layers are in direct contact with each other.

13. The composite membrane of claim 10, wherein at least two of the at least two microporous polymer layers are not in direct contact with each other.

14. The composite membrane of claim 1, wherein the microporous polymer structure comprises a fluorinated polymer.

15. The composite membrane of claim 14, wherein the fluorinated polymer is a polytetrafluoroethylene, a poly(ethylene-co-tetrafluoroethylene), an expanded polytetrafluoroethylene, a polyvinylidene fluoride, an expanded polyvinylidene fluoride, an expanded poly(ethylene-co-tetrafluoroethylene) or a mixture thereof.

16. The composite membrane of claim 14, wherein the fluorinated polymer is a perfluorinated expanded polytetrafluoroethylene.

17. The composite membrane of claim 1, wherein the microporous polymer structure comprises a hydrocarbon polymer.

18. The composite membrane of claim 1, wherein the microporous polymer structure is present in an amount from 16 vol % to 43 vol % based on the total volume of the composite membrane.

19. The composite membrane as in claim 1, wherein microporous polymer structure is present in an amount from 18 vol % to 28 vol % based on the total volume of the composite membrane.

20. The composite membrane as in claim 1, wherein the ion exchange material has an equivalent volume in an amount from 255 cc/mole eq to 415 cc/mole eq.

21. The composite membrane as in claim 1, wherein the ion exchange material has an equivalent volume from 310 cc/mole eq to 415 cc/mole eq.

22. The composite membrane as in claim 1, wherein the acid content is from 1.2 meq/cm$^3$ to 3.3 meq/cm$^3$.

23. The composite membrane as in claim 1, wherein the acid content is from 1.4 meq/cm$^3$ to 3.4 meq/cm$^3$.

24. The composite membrane as in claim 1, wherein the acid content is from 1.5 meq/cm$^3$ to 3.3 meq/cm$^3$.

25. The composite membrane as in claim 1, wherein the composite membrane has a selectivity of greater than 0.35 MPa/mV.

26. The composite membrane of claim 1, wherein the ion exchange material comprises at least one ionomer.

27. The composite membrane of claim 26, wherein the at least one ionomer comprises a proton conducting polymer.

28. The composite membrane of claim 27, wherein the proton conducting polymer comprises perfluorosulfonic acid.

29. The composite membrane of claim 26, wherein the at least one ionomer has a density not lower than 1.96 g/cc at 0% relative humidity.

30. The composite membrane as in claim 1, wherein the composite membrane has a thickness of less than 14 microns.

31. The composite membrane as in claim 1, wherein the composite membrane has a thickness of from 1 micron and 12 microns.

32. The composite membrane as in claim 1, further comprising at least one support layer attached to one or more external surfaces of the microporous polymer structure.

33. A membrane electrode assembly, comprising:
   at least one electrode; and
   the composite membrane according to claim 1 attached to the at least one electrode.

34. A fuel cell comprising the membrane electrode assembly according to claim 33.

35. A redox flow battery comprising the composite membrane according to claim 1.

* * * * *